(12) United States Patent
Deng et al.

(10) Patent No.: US 11,278,004 B2
(45) Date of Patent: Mar. 22, 2022

(54) TRANSMITTERS FOR ANIMALS AND METHODS FOR TRANSMITTING FROM ANIMALS

(71) Applicant: Battelle Memorial Institute, Richland, WA (US)

(72) Inventors: Z. Daniel Deng, Richland, WA (US); Huidong Li, Richland, WA (US); Chuan Tian, Richland, WA (US); Jun Lu, Richland, WA (US); Mitchell J. Myjak, Richland, WA (US); Jayson J. Martinez, Richland, WA (US); Jie Xiao, Richland, WA (US); Yuxing Wang, Richland, WA (US); Qiuyan Li, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 359 days.

(21) Appl. No.: 15/088,032

(22) Filed: Mar. 31, 2016

(65) Prior Publication Data

US 2017/0164581 A1   Jun. 15, 2017

Related U.S. Application Data

(60) Provisional application No. 62/267,738, filed on Dec. 15, 2015.

(51) Int. Cl.
  *A01K 11/00*     (2006.01)
  *A01K 61/90*     (2017.01)
  (Continued)

(52) U.S. Cl.
  CPC .......... *A01K 11/008* (2013.01); *A01K 11/006* (2013.01); *A01K 29/005* (2013.01);
  (Continued)

(58) Field of Classification Search
  None
  See application file for complete search history.

(56) References Cited

U.S. PATENT DOCUMENTS

| 2,775,939 A | 1/1957 | Fogal |
| 3,100,866 A | 8/1963 | Marks |
| (Continued) | | |

FOREIGN PATENT DOCUMENTS

| CA | 2091043 | 9/1994 |
| CN | 101714207 | 5/2010 |
| (Continued) | | |

OTHER PUBLICATIONS

WO PCT/US2014/053578 Inv-Pay Fees, Dec. 5, 2014, Battelle Memorial Institute.
(Continued)

*Primary Examiner* — David J Parsley
(74) *Attorney, Agent, or Firm* — Wells St. John P.S.

(57) ABSTRACT

Animal transmitters are provided that can include: a transducer configured to transmit a signal; process circuitry coupled to the transducer; and an energy harvesting element coupled to the process circuitry. Animals having a transmitter coupled thereto are also provided with the transmitter including an energy harvesting element in operational alignment with the animal's musculoskeletal system. Methods for transmitting the location of an animal are also provided with the methods including: coupling a transmitter powered by an energy harvesting element to the animal; and monitoring the transmissions of the transmitter.

8 Claims, 16 Drawing Sheets

(51) Int. Cl.
*A01K 29/00* (2006.01)
*G01S 1/72* (2006.01)
*H02N 2/18* (2006.01)

(52) U.S. Cl.
CPC .............. *A01K 61/90* (2017.01); *G01S 1/725* (2013.01); *H02N 2/186* (2013.01)

(56) References Cited

U.S. PATENT DOCUMENTS

| | | | |
|---|---|---|---|
| 3,262,093 A | 7/1966 | Junger et al. | |
| 3,292,303 A | 12/1966 | Fors | |
| 3,311,830 A | 3/1967 | Skirvin | |
| 3,576,732 A | 4/1971 | Weidinger et al. | |
| 3,713,086 A | 1/1973 | Trott | |
| 4,042,845 A | 8/1977 | Hackett | |
| 4,241,535 A | 12/1980 | Tsukuda | |
| 4,259,415 A | 3/1981 | Tamura et al. | |
| 4,336,709 A | 6/1982 | Meek | |
| 4,353,004 A | 10/1982 | Kleinschmidt | |
| 4,392,236 A * | 7/1983 | Sandstrom | G01N 23/223 119/215 |
| 4,679,559 A * | 7/1987 | Jefferts | A01K 61/90 119/215 |
| 4,762,427 A | 8/1988 | Hori et al. | |
| 4,790,090 A * | 12/1988 | Sharber | G09F 3/00 119/215 |
| 4,970,988 A * | 11/1990 | Heisey | A01K 79/00 119/215 |
| 4,986,276 A | 1/1991 | Wright | |
| 5,177,891 A | 1/1993 | Holt | |
| 5,211,129 A | 5/1993 | Taylor et al. | |
| 5,324,940 A * | 6/1994 | Ekstrom | A01K 11/00 119/215 |
| 5,344,357 A | 9/1994 | Lyczek | |
| 5,517,465 A | 5/1996 | Nestler et al. | |
| 5,675,555 A | 10/1997 | Evans et al. | |
| 5,697,384 A | 12/1997 | Miyawaki et al. | |
| 5,857,881 A | 1/1999 | Zippel, Sr. | |
| 5,974,304 A | 10/1999 | Chen | |
| 5,995,451 A | 11/1999 | Evans et al. | |
| 6,021,731 A | 2/2000 | French et al. | |
| 6,201,766 B1 | 3/2001 | Carlson et al. | |
| 6,662,742 B2 | 12/2003 | Shelton et al. | |
| 6,689,056 B1 * | 2/2004 | Kilcoyne | A61B 5/0031 128/898 |
| 6,712,772 B2 | 3/2004 | Cohen et al. | |
| 6,766,950 B2 | 7/2004 | Hall | |
| 6,904,798 B2 | 6/2005 | Boucher et al. | |
| 6,926,765 B2 | 8/2005 | Brickett | |
| 7,016,260 B2 | 3/2006 | Baray | |
| 7,289,931 B2 | 10/2007 | Ebert | |
| 7,457,720 B2 | 11/2008 | Ebert | |
| 8,032,429 B2 | 10/2011 | Shafer | |
| 8,033,890 B2 | 10/2011 | Warner et al. | |
| 8,360,327 B2 * | 1/2013 | Clarke | G06K 19/041 119/174 |
| 8,448,592 B2 | 5/2013 | Crowell et al. | |
| 8,564,985 B2 | 10/2013 | van Straaten | |
| 8,922,373 B2 | 12/2014 | Michelson | |
| 9,266,591 B2 | 2/2016 | Lu | |
| 9,453,854 B2 | 9/2016 | Kraige et al. | |
| 9,526,228 B2 | 12/2016 | Fraser et al. | |
| 10,452,143 B2 | 10/2019 | Moon et al. | |
| 10,935,536 B2 | 3/2021 | Deng et al. | |
| 11,104,404 B2 | 8/2021 | Wienders | |
| 2003/0034887 A1 | 2/2003 | Crabtree et al. | |
| 2003/0085684 A1 | 5/2003 | Tsukamoto et al. | |
| 2003/0117893 A1 | 6/2003 | Baray | |
| 2003/0128847 A1 | 7/2003 | Smith | |
| 2004/0133081 A1 | 7/2004 | Teller et al. | |
| 2004/0220856 A1 * | 11/2004 | Moore | G06K 19/07758 705/14.23 |
| 2005/0158246 A1 | 7/2005 | Takizawa et al. | |
| 2006/0218374 A1 | 9/2006 | Ebert | |
| 2007/0083119 A1 | 4/2007 | Adachi et al. | |
| 2007/0088194 A1 | 4/2007 | Tahar et al. | |
| 2007/0103314 A1 | 5/2007 | Geissler | |
| 2007/0171012 A1 | 7/2007 | Fujimori et al. | |
| 2007/0288160 A1 | 12/2007 | Ebert | |
| 2008/0174409 A1 | 7/2008 | Frank | |
| 2008/0269614 A1 | 10/2008 | Adachi et al. | |
| 2009/0073802 A1 | 3/2009 | Nizzola et al. | |
| 2009/0079368 A1 | 3/2009 | Poppen et al. | |
| 2009/0182426 A1 | 7/2009 | Von Arx et al. | |
| 2009/0188320 A1 | 7/2009 | Greenough et al. | |
| 2009/0306633 A1 | 12/2009 | Trovato et al. | |
| 2011/0077659 A1 | 3/2011 | Mandecki et al. | |
| 2011/0105829 A1 | 5/2011 | Ball | |
| 2011/0163857 A1 | 7/2011 | August et al. | |
| 2011/0181399 A1 | 7/2011 | Pollack et al. | |
| 2011/0254529 A1 | 10/2011 | van Straaten | |
| 2012/0134239 A1 | 5/2012 | Struthers | |
| 2012/0277550 A1 | 11/2012 | Rosenkranz et al. | |
| 2013/0012865 A1 | 1/2013 | Sallberg et al. | |
| 2013/0181839 A1 | 7/2013 | Cao | |
| 2013/0237774 A1 | 9/2013 | Schentag et al. | |
| 2013/0324059 A1 | 12/2013 | Lee et al. | |
| 2014/0005758 A1 | 1/2014 | Ben-Yehuda et al. | |
| 2014/0142556 A1 | 5/2014 | Kuo et al. | |
| 2014/0211594 A1 | 7/2014 | Allen et al. | |
| 2015/0063072 A1 | 3/2015 | Deng et al. | |
| 2015/0241566 A1 | 8/2015 | Chakraborty et al. | |
| 2015/0289479 A1 * | 10/2015 | Allen | G01S 5/18 367/135 |
| 2015/0351365 A1 | 12/2015 | Claver Tallon et al. | |
| 2016/0104355 A1 | 4/2016 | Alexander et al. | |
| 2016/0211924 A1 | 7/2016 | Deng et al. | |
| 2016/0245894 A1 | 8/2016 | Deng et al. | |
| 2017/0089878 A1 | 3/2017 | Deng et al. | |
| 2017/0170850 A1 | 6/2017 | Deng et al. | |
| 2019/0250290 A1 | 8/2019 | Oeverland | |
| 2020/0079475 A1 | 3/2020 | Wienders | |

FOREIGN PATENT DOCUMENTS

| | | |
|---|---|---|
| EP | 20373961 A1 | 3/2009 |
| GB | 2188028 A | 9/1987 |
| JP | 61-291294 | 12/1986 |
| WO | WO 95/03691 | 2/1995 |
| WO | WO 2011/068825 | 6/2011 |
| WO | WO 2011/079338 | 7/2011 |
| WO | WO 2015/031853 | 3/2015 |
| WO | WO PCT/US2020/021744 | 9/2021 |

OTHER PUBLICATIONS

WO PCT/US2014/053578 IPRP, Mar. 1, 2016, Battelle Memorial Institute.

WO PCT/US2014/053578 Search Report, dated Mar. 5, 2015, Battelle Memorial Institute.

WO PCT/US2014/053578 Writ. Opin., Mar. 5, 2015, Battelle Memorial Institute.

Aktakka et al., "Energy Scavenging from Insect Flight", Journal of Micromechanics and Microengineering vol. 21, 095016, 2011, United Kingdom, 10 pages.

Brown et al., "An Evaluation of the Maximum Tag Burden for Implantation of Acoustic Transmitters in Juvenile Chinook Salmon", North American Journal of Fisheries Management vol. 30, 2010, United States, pp. 499-505.

Cha et al., "Energy Harvesting from a Piezoelectric Biomimetic Fish Tail", Renewable Energy vol. 86, 2016, Netherlands, pp. 449-458.

Cha et al., "Energy Harvesting from the Tail Beating of a Carangiform Swimmer using Ionic Polymer-Metal Composites", Bioinspiration and Biomimetics vol. 8, 2013, United Kingdom, 15 pages.

Cook et al., "A Comparison of Implantation Methods for Large PIT Tags or Injectable Acoustic Transmitters in Juvenile Chinook Salmon", Fisheries Research vol. 154, 2014, Netherlands, pp. 213-223.

(56) References Cited

OTHER PUBLICATIONS

Dagdeviren et al., "Conformal Piezoelectric Energy Harvesting and Storage from Motions of the Heart, Lung, and Diaphragm", Proceedings of the National Academy of Sciences of the United States of America vol. 111, 2014, United States, pp. 1927-1932.

Deng et al., "A Cabled Acoustic Telemetry System for Detecting and Tracking Juvenile Salmon: Part 2. Three-Dimensional Tracking and Passage Outcomes", Sensors vol. 11, 2011, Switzerland, pp. 5661-5676.

Deng et al., "An Injectable Acoustic Transmitter for Juvenile Salmon", Scientific Reports, Jan. 29, 2015, United Kingdom, 6 pages.

Deng et al., "Design and Instrumentation of a Measurement and Calibration System for an Acoustic Telemetry System", Sensors vol. 10, 2010, Switzerland, pp. 3090-3099.

Deng et al., U.S. Appl. No. 14/914,974, filed Feb. 26, 2016, titled "Acoustic Transmission Devices and Process for Making and Using Same", 82 pages.

Deng et al., U.S. Appl. No. 15/087,936, filed Mar. 31, 2016, titled "Signal Transmitter and Methods for Transmitting Signals from Animals", 59 pages.

Deng et al., U.S. Appl. No. 62/267,797, filed Dec. 15, 2015, titled "Signal Transmitter and Methods for Transmitting Signals from Animals", 34 pages.

Eppard, "Juvenile Salmon Acoustic Telemetry System JSATS", Dec. 14, 2011, URL: http://www.nwcouncil.org/media/23478/jsats.pdf, pp. 1-13.

Erturk et al., "Underwater Thrust and Power Generation Using Flexible Piezoelectric Composites: An Experimental Investigation Toward Self-Powered Swimmer-Sensor Platforms", Smart Materials and Structures vol. 20, 125013, 2011, United Kingdom, 11 pages.

Hwang et al., "Self-Powered Cardiac Pacemaker Enabled by Flexible Single Crystalline PMN-PT Piezoelectric Energy Harvester", Advanced Materials vol. 26, 2014, Germany, pp. 4880-4887.

Hwang et al., "Self-Powered Deep Brain Stimulation via a Flexible PIMNT Energy Harvester", Energy and Environmental Science vol. 8, 2015, United Kingdom, pp. 2677-2684.

Lam et al., "Physical Characteristics and Rate Performance of (CFx)n (0.33<x<9,66) in Lithium Batteries", Journal of Power Sources vol. 153, 2006, Netherlands, pp. 354-359.

Li et al., "Design Parameters of a Miniaturized Piezoelectric Underwater Acoustic Transmitter", Sensors vol. 12, 2012, Switzerland, pp. 9098-9109.

Li et al., "Energy Harvesting from Low Frequency Applications using Piezoelectric Materials", Applied Physics Reviews 1, 041301, 2014, United States, 20 pages.

Li et al., "Piezoelectric Materials Used in Underwater Acoustic Transducers" Sensor Letters vol. 10 (3/4), 2012, United States, pp. 679-697.

Li et al., "Piezoelectric Transducer Design for a Miniaturized Injectable Acoustic Transmitter", Smart Materials and Structures vol. 24, 115010, 2015, United Kingdom, 9 pages.

McMichael et al., "The Juvenile Salmon Acoustic Telemetry System: A New Tool", Fisheries vol. 35, No. 1, Jan. 1, 2010, United States, pp. 9-22.

Meduri et al., "Hybrid CVx-Ag2V4O11 as a High-Energy, Power Density Cathode for Application in an Underwater Acoustic Microtransmitter", Electrochemistry Communications vol. 13, 2011, United States, pp. 1344-1348.

Ritchie et al., "Further Developments of Lithium/Polycarbon Monofluoride Envelope Cells", Journal of Power Sources vol. 96, 2001, Netherlands, pp. 180-183.

Rub et al., "Comparative Performance of Acoustic-Tagged and Passive Integrated Transponder-Tagged Juvenile Salmonids in the Columbia and Snake Rivers", U.S. Army Corps of Engineers, Portland District, Portland Oregon, 2007, United States, 163 pages.

S.M. Corporation, "Macro Fiber Composite—MFC" Smart Material Brochure, United States, 8 pages.

Shafer, "Energy Harvesting and Wildlife Monitoring", available online at http://www.ofwim.org/wp-content/uploads/2014/11/Shafer_keynote.pdf, 2014, 36 pages.

Weiland et al., "A Cabled Acoustic Telemetry System for Detecting and Tracking Juvenile Salmon: Part 1. Engineering Design and Instrumentation", Sensors vol. 11, No. 12, Dec. 26, 2011, Switzerland, pp. 5645-5660.

Yazami et al., "Fluorinated Carbon Nanofibres for High Energy and High Power Densities Primary Lithium Batteries", Electrochemistry Communications vol. 9, 2007, United States, pp. 1850-1855.

Zhang et al., "Enhancement of Discharge Performance of Li/CFx Cell by Thermal Treatment of CFx Cathode Material", Journal of Power Sources vol. 188, 2009, Netherlands, pp. 601-605.

Deng et al., U.S. Appl. No. 14/871,761, filed Sep. 30, 2015, titled "Autonomous Sensor Fish to Support Advanced Hydropower Development", 41 pages.

CN CN 102588463 Abst/Full Ref, Jul. 11, 2012, 715th Res Inst Shipbld Ind Corp.

CN CN 102598716 Abst/Full Ref, Jul. 18, 2012, Vibrant Med EL Hearing Tech G.

CN CN 102754249 Abst/Full Ref, Oct. 24, 2012, Eaglepicher Technologies, LLC.

CN CN 1424592 Abst/Full Ref, Jun. 18, 2003, Institut Francais du Petrole.

CN CN 2014800479315 Search Rept, Jul. 26, 2017, Battelle Memorial Institute.

CN CN 202414143 Abst/Full Ref, Sep. 5, 2012, 715th Res Inst Shipbld Ind Corp.

EP EP 1705500B1 Full Ref, Jun. 16, 2010, SAP AG.

WO PCT/US2015/062200 IPRP, Aug. 29, 2017, Battelle Memorial Institute.

WO PCT/US2015/062200 Search Rept., Feb. 24, 2016, Battelle Memorial Institute.

WO PCT/US2015/062200 Writt Opin., Feb. 24, 2016, Battelle Memorial Institute.

Biopack Systems, Inc. Hardware Guide, 2013, 152 pages.

Dinwoodie, "Dual Output Boost Converter", Texas Instruments Application Report SLUA288, available online at http://www.ti.com/lit/an/slua288/slua288.pdf, Apr. 2003, 9 pages.

Gallego-Juarez et al., "Experimental Study of Nonlinearity in Free Progressive Acoustic Waves in Air at 20 kHz", Journal de Physique, Colloques, 40 (C8), 1979, France, pp. 336-340.

Li et al., "Piezoelectric Materials used in Underwater Acoustic Transmitters", Sensor Letters vol. 10, 2012, United States, 65 pages.

GB GB 1195633 A, Derwent Summary, Jun. 17, 1970, Varta AG.

Brown, "Design Considerations for Piezoelectric Polymer Ultrasound Transducers", IEEE Transactions on Ultrasonics, Ferroelectrics, and Frequency Control vol. 47, No. 6, Nov. 2000, United States, pp. 1377-1396.

Brown, "The Effects of Material Selection for Backing and Wear Protection/Quarter-Wave Matching of Piezoelectric Polymer Ultrasound Transducers", IEEE Ultrasonics Symposium, 2000, United States, pp. 1029-1032.

Cada, "The Development of Advanced Hydroelectric Turbines to Improve Fish Passage Survival", Fisheries vol. 26, No. 9, Sep. 2001, United States, pp. 14-23.

Carlson et al., "Sensor Fish Characterization of Spillway Conditions at Ice Harbor Dam in 2004, 2005 and 2006", PNWD-3839 Final Report, Mar. 2008, United States, 95 pages.

Carlson et al., "The Sensor Fish—Making Dams More Salmon-Friendly", Sensors Online, Jul. 2004, United States, 7 pages.

Coutant, "Fish Behavior in Relation to Passage Through Hydropower Turbines: A Review", Transactions of the American Fisheries Society vol. 129, 2000, United States, pp. 351-380.

Deng et al., "Design and Implementation of a New Autonomous Sensor Fish to Support Advanced Hydropower Development", Review of Scientific Instruments vol. 85, 2014, United States, 6 pages.

Deng et al., "Evaluation of Fish-Injury Mechanisms During Exposure to Turbulent Shear Flow", Canadian Journal of Fisheries and Aquatic Sciences vol. 62, 2005, Canada, pp. 1513-1522.

(56) References Cited

OTHER PUBLICATIONS

Deng et al., "Six-Degree-of-Freedom Sensor Fish Design and Instrumentation", Sensors vol. 7, 2007, United States, pp. 3399-3415.

Deng et al., "Use of an Autonomous Sensor to Evaluate the Biological Performance of the Advanced Turbine at Wanapum Dam", Journal of Renewable and Sustainable Energy vol. 2, 2010, United States, 11 pages.

Johnson et al., "A Digital Acoustic Recording Tag for Measuring the Response of Wild Marine Mammals to Sound", IEEE Journal of Oceanic Engineering vol. 28, No. 1, Jan. 2003, United States, pp. 3-12.

Kogan et al., "Acoustic Concentration of Particles in Piezoelectric Tubes. Theoretical Modeling of the Effect of Cavity Shape and Symmetry Breaking", The Journal of the Acoustical Society of America vol. 116, No. 4, 2004, United States, pp. 1967-1974.

Odeh, "A Summary of Environmentally Friendly Turbine Design Concepts", DOE/ID/13741 Paper, Jul. 1999, United States, 47 pages.

Richmond et al., "Response Relationships Between Juvenile Salmon and an Autonomous Sensor in Turbulent Flow", Fisheries Research vol. 97, 2009, Netherlands, pp. 134-139.

WO PCT/US2017/038082 Inv Pay Fees, Sep. 15, 2017, Battelle Memorial Institute.

WO PCT/US2017/038082 Search Report, dated Nov. 20, 2017, Battelle Memorial Institute.

WO PCT/US2017/038082 Writ Opin., Nov. 20, 2017, Battelle Memorial Institute.

Adams et al., "Effects of Surgically and Gastrically Implanted Radio Transmitters on Swimming Performance and Predator Avoidance of Juvenile Chinook Salmon (*Oncorhynchus tshawytscha*)", Canadian Journal of Fisheries and Aquatic Sciences 55, 1998, Canada, pp. 781-787.

Anglea et al., "Effects of Acoustic Transmitters on Swimming Performance and Predator Avoidance of Juvenile Chinook Salmon", North American Journal of Fisheries Management 24, 2004, United States, pp. 162-170.

Atlantic States Marine Fisheries Commission, "American Eel Benchmark Stock Assessment Report No. 12-01", May 2012, United States, 340 pages.

Bams, "Differences in Performance of Naturally and Artificially Propagated Sockeye Salmon Migrant Fry, as Measured With Swimming and Predation Tests", Journal of the Fisheries Board of Canada 24(5), 1967, Canada, pp. 1117-1153.

Barbin et al., "Behaviour and Swimming Performance of Elvers of the American Eel, Anguilla rostrata, in an Experimental Flume", Journal of Fish Biology 45, 1994, United Kingdom, pp. 111-121.

Boubee et al., "Downstream Passage of Silver Eels at a Small Hydroelectric Facility", Fisheries Management and Ecology vol. 13, 2006, United Kingdom, pp. 165-176.

Brett, "The Respiratory Metabolism and Swimming Performance of Young Sockeye Salmon", Journal of the Fisheries Board of Canada 21(5), 1964, Canada, pp. 1183-1226.

Brown et al., "Evidence to Challenge the "2% Rule" for Biotelemetry", North American Journal of Fisheries Management 19, 1999, United States, pp. 867-871.

Brown et al., "Survival of Seaward-Migrating PIT and Acoustic-Tagged Juvenile Chinook Salmon in the Snake and Columbia Rivers: An Evaluation of Length-Specific Tagging Effects", Animal Biotelemetry 1:8, 2013, United States, 13 pages.

Collins et al., "Intracoelomic Acoustic Tagging of Juvenile Sockeye Salmon: Swimming Performance, Survival, and Postsurgical Wound Healing in Freshwater and during a Transition to Seawater", Transactions of the American Fisheries Society 142, 2013, United States, pp. 515-523.

Cote et al., "Swimming Performance and Growth Rates of Juvenile Atlantic Cod Intraperitoneally Implanted with Dummy Acoustic Transmitters", North American Journal of Fisheries Management vol. 19, 1999, United States, pp. 1137-1141.

Counihan et al., "Influence of Externally Attached Transmitters on the Swimming Performance of Juvenile White Sturgeon", Transactions of the American Fisheries Society 128, 1999, United States, pp. 965-970.

Deng et al., U.S. Appl. No. 15/393,617, filed Dec. 29, 2016, titled "Systems and Methods for Monitoring Organisms Within an Aquatic Environment", 49 pages.

Fisheries and Oceans Canada (DFO), "Recovery Potential Assessment of American Eel (*Anguilla rostrata*) in Eastern Canada", Canadian Science Advisory Secretariat Science Advisory Report 2013/078, 2013, Canada, 65 pages.

Harnish et al., "A Review of Polymer-Based Water Conditioners for Reduction of Handling-Related Injury", Reviews in Fish Biology and Fisheries 21, 2011, Netherlands, pp. 43-49.

Janak et al., "The Effects of Neutrally Buoyant, Externally Attached Transmitters on Swimming Performance and Predator Avoidance of Juvenile Chinook Salmon", Transactions of the American Fisheries Society 141, 2012, United States, pp. 1424-1432.

MacGregor et al., "Recovery Strategy for the American Eel (*Anguilla rostrata*) in Ontario", Ontario Recovery Strategy Series, Prepared for Ontario Ministry of Natural Resources, Peterborough, Ontario, 2013, Canada, 131 pages.

McGrath et al., "Studies of Upstream Migrant American Eels at the Moses-Saunders Power Dam on the St. Lawrence River near Massena, New York", American Fisheries Society Symposium 33, 2003, United States, pp. 153-166.

Mesa et al., "Survival and Growth of Juvenile Pacific Lampreys Tagged with Passive Integrated Transponders (PIT) in Freshwater and Seawater", Transactions of the American Fisheries Society 141, 2012, United States, pp. 1260-1268.

Mueller et al., "Tagging Juvenile Pacific Lamprey with Passive Integrated Transponders: Methodology, Short-Term Mortality, and Influence on Swimming Performance", North American Journal of Fisheries Management vol. 26, 2006, United States, pp. 361-366.

Normandeau, "Survey for Upstream American Eel Passage at Holyoke Dam, Connecticut River, Massachusetts, 2006", Prepared for Holyoke Gas and Electric by Normandeau Associates, Inc., Apr. 26, 2007, United States, 68 pages.

Økland et al., "Recommendations on Size and Position of Surgically and Gastrically Implanted Electronic Tags in European Silver Eel", Animal Biotelemetry 1:6, 2013, United Kingdom, pp. 1-5.

Panther et al., "Influence of Incision Location on Transmitter Loss, Healing, Survival, Growth, and Suture Retention of Juvenile Chinook Salmon", Transactions of the American Fisheries Society 140, 2011, United States, pp. 1492-1503.

Summerfelt et al., "Anesthesia, Surgery, and Related Techniques", in Schreck, C.B., Moyle, P.B., (Eds.), Methods for Fish Biology, American Fisheries Society, 1990, United States, pp. 213-272.

Verdon et al., "Recruitment of American Eels in the Richelieu River and Lake Champlain: Provision of Upstream Passage as a Regional-Scaie Solution to a Large-Scale Problem", American Fisheries Society Symposium 33, 2003, United States, pp. 125-138.

Walker et al., "Effects of a Novel Acoustic Transmitter on Swimming Performance and Predator Avoidance of Juvenile Chinook Salmon: Determination of a Size Threshold", Fisheries Research 176, Apr. 2016, Netherlands, pp. 48-54.

Ward et al., "A Laboratory Evaluation of Tagging-Related Mortality and Tag Loss in Juvenile Humpback Chub", North American Journal of Fisheries Management 35, 2015, United States, pp. 135-140.

Wuenschel et al., "Swimming Ability of Eels (*Anguilla rostrata, Conger oceanicus*) at Estuarine Ingress: Contrasting Patterns of Cross-Shelf Transport?", Marine Biology 154, 2008, Germany, pp. 775-786.

Zale et al., "Effects of Surgically Implanted Transmitter Weights on Growth and Swimming Stamina of Small Adult Westslope Cutthroat Trout", Transactions of the American Fisheries Society vol. 134(3), 2005, United States, pp. 653-660.

WO PCT/US2016/054981 Search Rept., Nov. 18, 2016, Battelle Memorial Institute.

WO PCT/US2016/054981 Writ. Opin., Nov. 18, 2016, Battelle Memorial Institute.

(56) References Cited

OTHER PUBLICATIONS

WO PCT/US2016/055045 Search Rept., Feb. 7, 2017, Battelle Memorial Institute.
WO PCT/US2016/055045 Writ. Opin., Feb. 7, 2017, Battelle Memorial Institute.
Butler et al., "A Tri-Modal Directional Modem Transducer", Oceans 2003 MTS/IEEE Conference, Sep. 22-26, 2003, United States, pp. 1554-1560.
Carlson et al., "Juvenile Salmon Acoustic Telemetry System Transmitter Downsize Assessment", Pacific Northwest National Laboratory, Richland, WA, 2010, United States, 30 pages.
Dillon, "Use and Calibration of the Internal Temperature Indicator", Microchip Technology Inc. AN1333, 2010, United States, 12 pages.
El Rifai et al., "Modeling of Piezoelectric Tube Actuators", Dspace@MIT Innovation in Manufacturing Systems and Technology (IMST), 2004, Singapore, 9 pages.
Lewandowski et al., "In Vivo Demonstration of a Self-Sustaining, Implantable, Stimulated-Muscle-Powered Piezoelectric Generator Prototype", Annals of Biomedical Engineering vol. 37, No. 11, Nov. 2009, Netherlands, pp. 2390-2401.
Pacific Northwest National Laboratory, "JSATS Tag Downsize Project Progess Report", PNNL, Apr. 26, 2010, United States, 16 pages.
Pacific Northwest National Laboratory, "Juvenile Salmon Acoustic Telemetry System (JSATS) Acoustic Transmitters", PNNL, Mar. 2010, United States, 1 page.
Platt et al., "The Use of Piezoelectric Ceramics for Electric Power Generation Within Orthopedic Implants", IEEE/ASME Transactions on Mechatronics vol. 10, No. 4, Aug. 2005, United States, pp. 455-461.
Rifai et al., "Modeling of Piezoelectric Tube Actuators", Dspace@MIT, available online at https://dspace.mit.edu/bitstream/handle/1721.1/3911/IMST014.pdf, 2004, 8 pages.
WO PCT/US2016/054981 IPRP, Jun. 19, 2018, Battelle Memorial Institute.
WO PCT/US2016/055045 IPRP, Jun. 19, 2018, Battalle Memorial Institute.
WO PCT/US2017/038082 IPRP, Feb. 26, 2019, Battelle Memorial Institute.
Deng et al., U.S. Appl. No. 16/351,373, filed Mar. 12, 2019, titled "Sensor Assemblies and Methods for Emulating Interaction of Entities Within Water Systems", 30 pages.
CN 2015800768080 Search Report, dated Nov. 21, 2019, Battelle Memorial Institute.
Brown, "Power Sources and Supplies", ISBN 978-7-5124-10527, Oct. 2013, China, 5 pages plus English translation.
China Electrical Appliance Industrial Insttute, Editor of "Electrical and Electronic Technologies", Collection of Translations of Articles in 1992 International Electrical and Electronic Academic Conference, Nov. 1993, China, p. 540 plus English translation.
WO PCT/US2020/021744 Search Rpt, Jun. 12, 2020, Battelle Memorial Institute.
WO PCT/US2020/021744 Written Opin, Jun. 12, 2020, Battelle Memorial Institute.

* cited by examiner

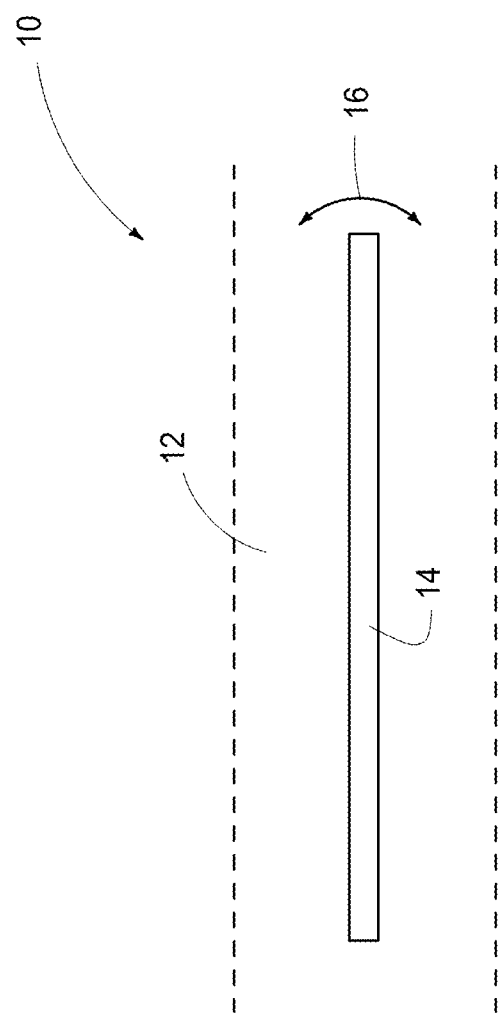

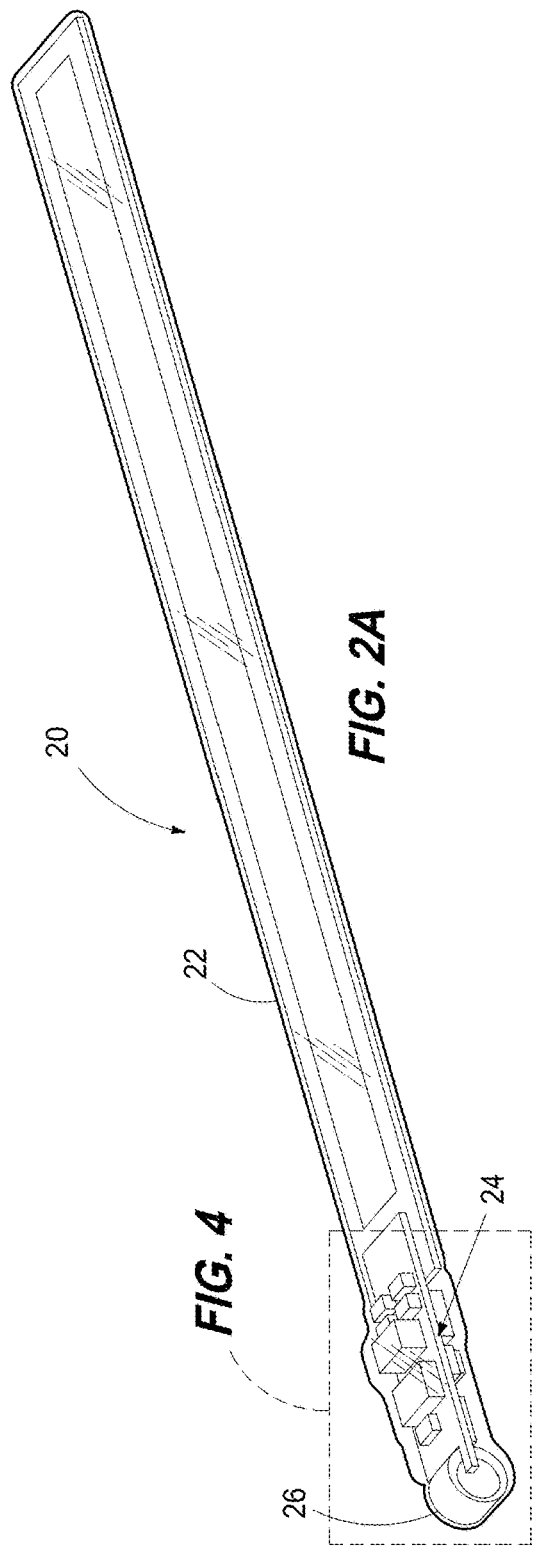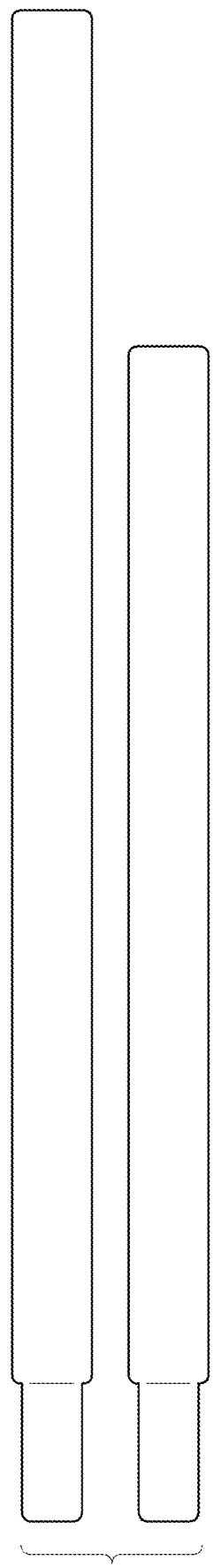

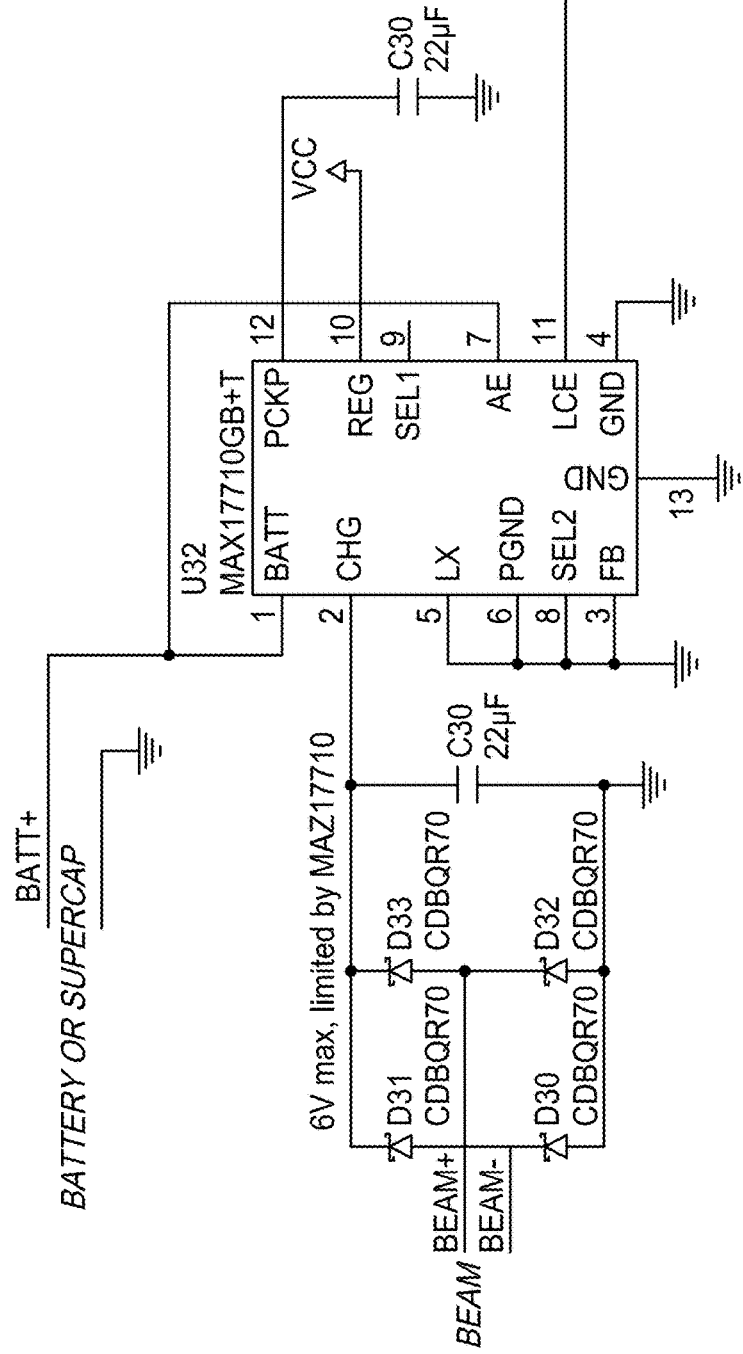

TRANSMITTERS FOR ANIMALS AND METHODS FOR TRANSMITTING FROM ANIMALS

CROSS REFERENCE TO RELATED APPLICATION

This application claims priority to U.S. Provisional Patent Application Ser. No. 62/267,738 which was filed on Dec. 15, 2015, the entirety of which is incorporated by reference herein.

STATEMENT AS TO RIGHTS TO INVENTIONS MADE UNDER FEDERALLY-SPONSORED RESEARCH AND DEVELOPMENT

This invention was made with Government support under Contract DE-AC0576RL01830 awarded by the U.S. Department of Energy. The Government has certain rights in the invention.

TECHNICAL FIELD

The present disclosure relates to animal tracking using transmitters. Particular embodiments of the disclosure provide transmitters for animals and methods of transmitting from animals.

BACKGROUND

Animal transmitters are available; however, they are limited by the finite energy capacities of their power sources.

As an example, for an underwater acoustic fish tag, the weight and volume associated with the battery are the limiting factors in transmitter operational life, which subsequently affects the length of time the tagged fish can be studied.

Despite many years' research on salmon recovery, there is a lack of information on both Atlantic and Pacific salmon, and other fish, across all of their life stages. In addition, for many other species with long life history such as American eel and lamprey that are likely to be listed under the Endangered Species Act (ESA) soon and will have major impact on hydropower operations, there is a need for a long-life monitoring technology. Acoustic telemetry and radio telemetry have been the best available technologies to monitor fish movement and survival in the past several decades. Small transmitters are needed to be implanted into the fish so the movement of the fish can be tracked by the receivers. However, autonomous electronic devices, especially small or micro devices, are limited by the finite energy capacities of their batteries. For example, a small injectable acoustic micro-transmitter compatible with the Juvenile Salmon Acoustic Telemetry System (JSATS) to track juvenile salmon may last only 90 days even though its battery accounts for about half of its weight and volume.

The present disclosure provides transmitters for animals and methods of transmitting from animals that can include a transmitter that can harvest the mechanical energy from the motion of an animal to power itself.

SUMMARY OF THE DISCLOSURE

Animal transmitters are provided that can include: a transducer configured to transmit a signal; control circuitry coupled to the transducer; and an energy harvesting element coupled to the control circuitry.

Animals having a transmitter coupled thereto are also provided with the transmitter including an energy harvesting element in operational alignment with the animal's musculoskeletal system.

Methods for transmitting the location of an animal are also provided with the methods including: coupling a transmitter powered by an energy harvesting element to the animal; and monitoring the transmissions of the transmitter.

DRAWINGS

Embodiments of the disclosure are described below with reference to the following accompanying drawings.

FIG. 1 is a depiction of a transmitter of the present disclosure implanted in an animal.

FIGS. 2A-B depict a transmitter according to one embodiment of the present disclosure.

FIGS. 3A-B are block diagrams showing the components of two embodiments of the present disclosure.

FIG. 4 is a more detailed view of transmitter components that are associated with the circuit board of the transmitter according to an embodiment of the disclosure.

FIGS. 5A-C depict different views of an offset piezoelectric transducer of the present disclosure.

FIGS. 6A-B2 depict circuit diagrams of two transmitters according to embodiments of the disclosure.

Figure 9A:
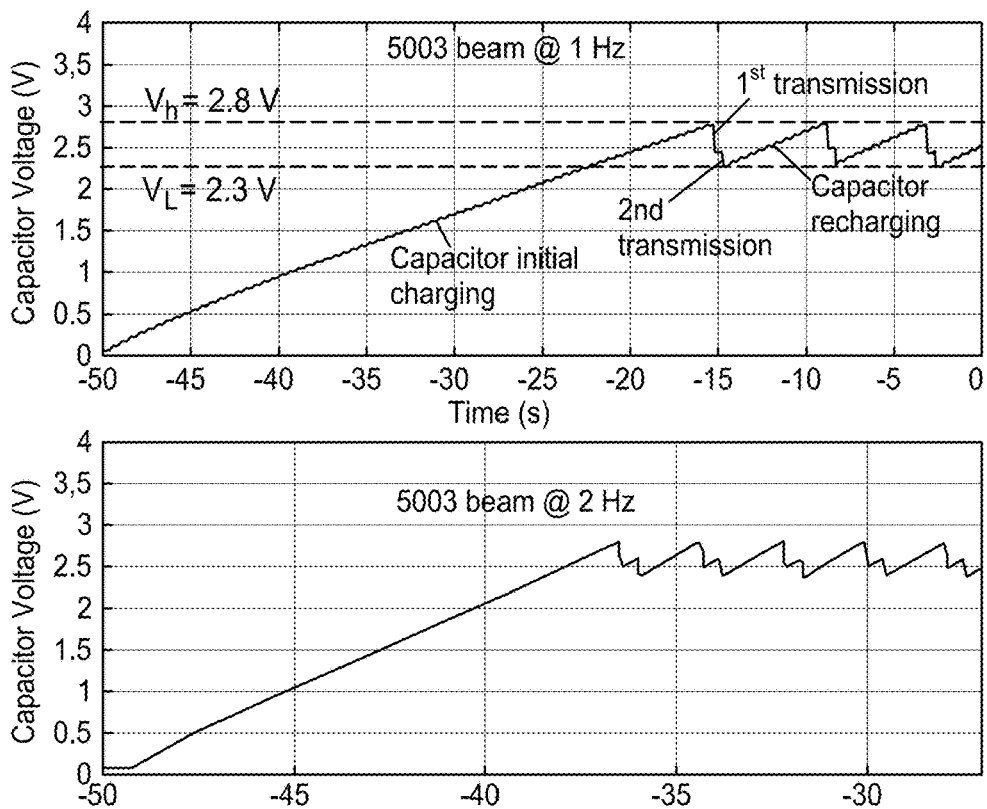
Figure 9B:
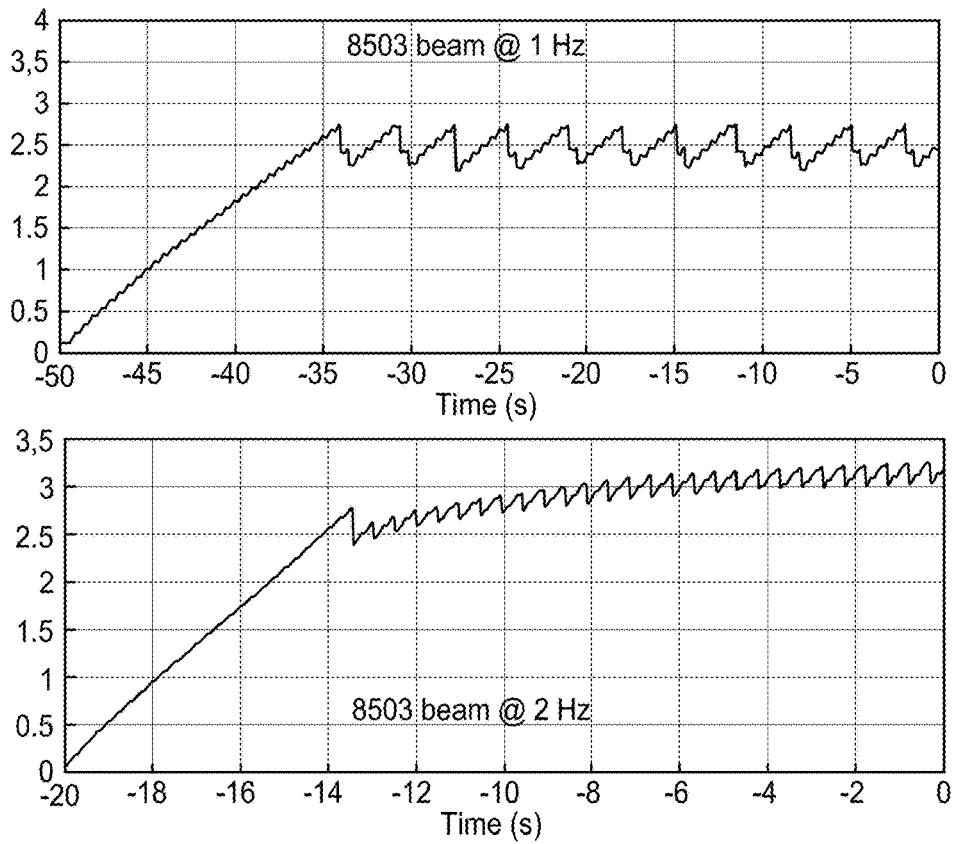

FIGS. 9A-B depict additional data acquired using embodiments of the disclosure.

Figure 10A:
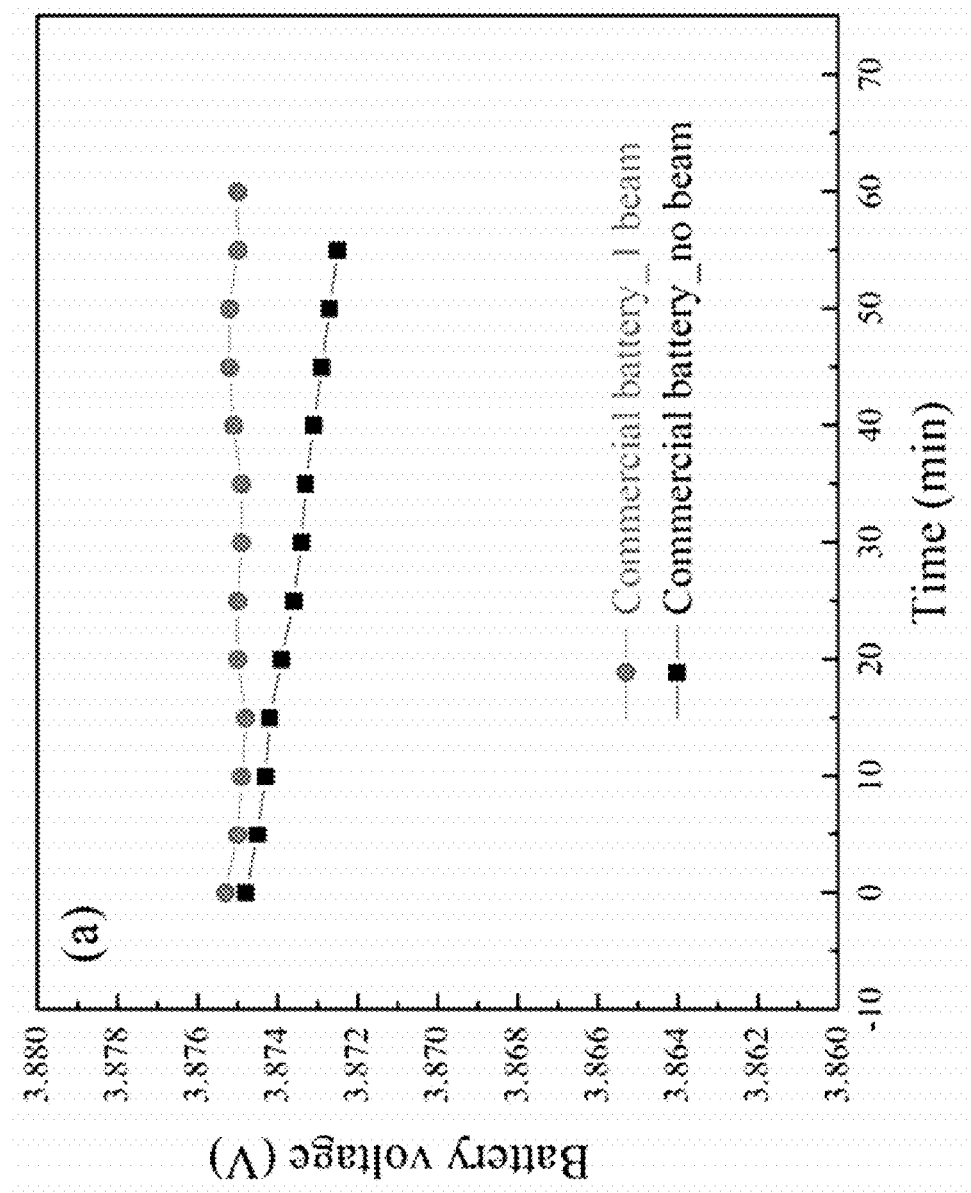
Figure 10B:
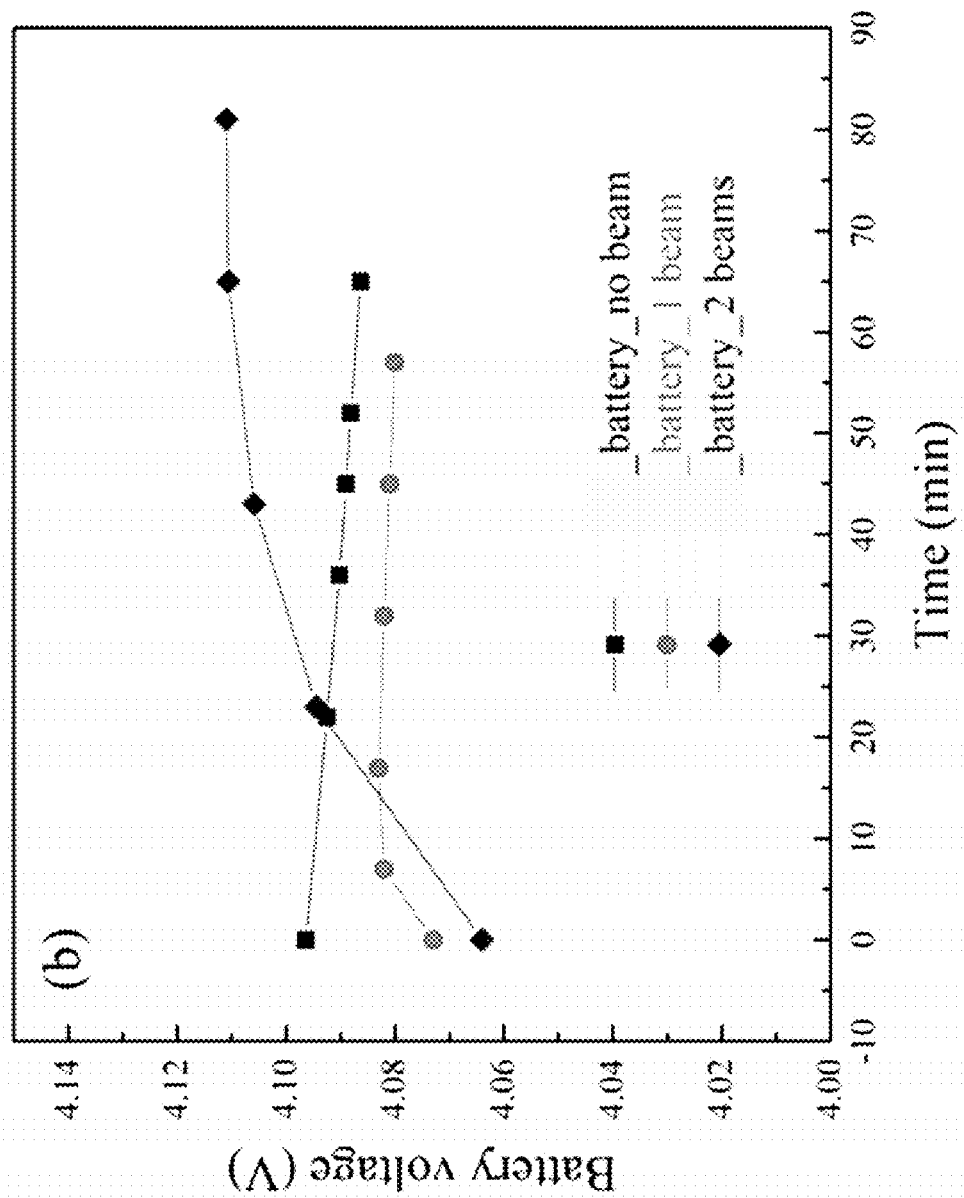

FIGS. 10A-B depict additional data acquired using embodiments of the disclosure.

Figure 11A:
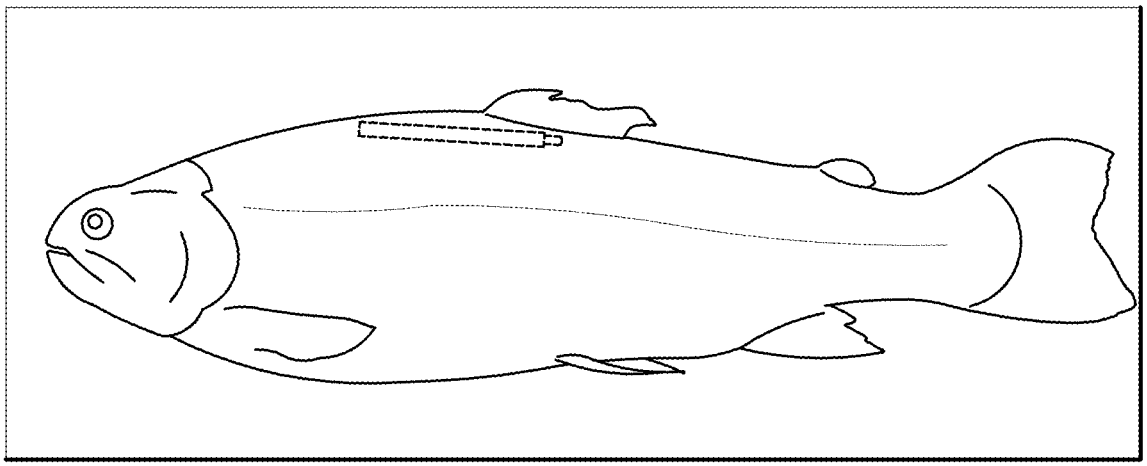
Figure 11B:
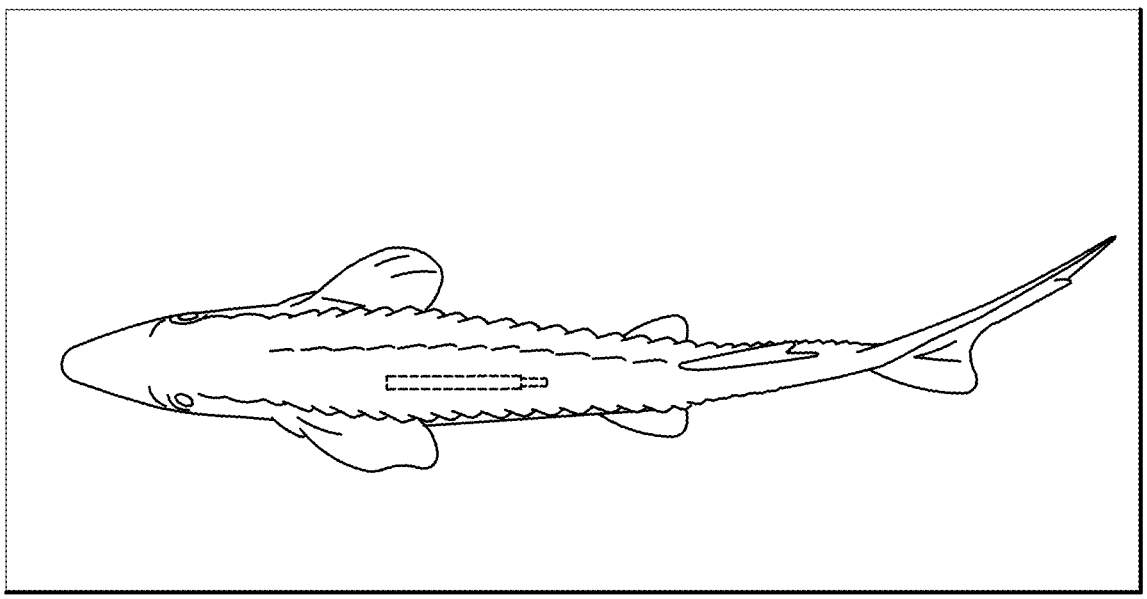

FIGS. 11A-B are depictions of transmitters within animals according to embodiments of the present disclosure.

Figure 12:
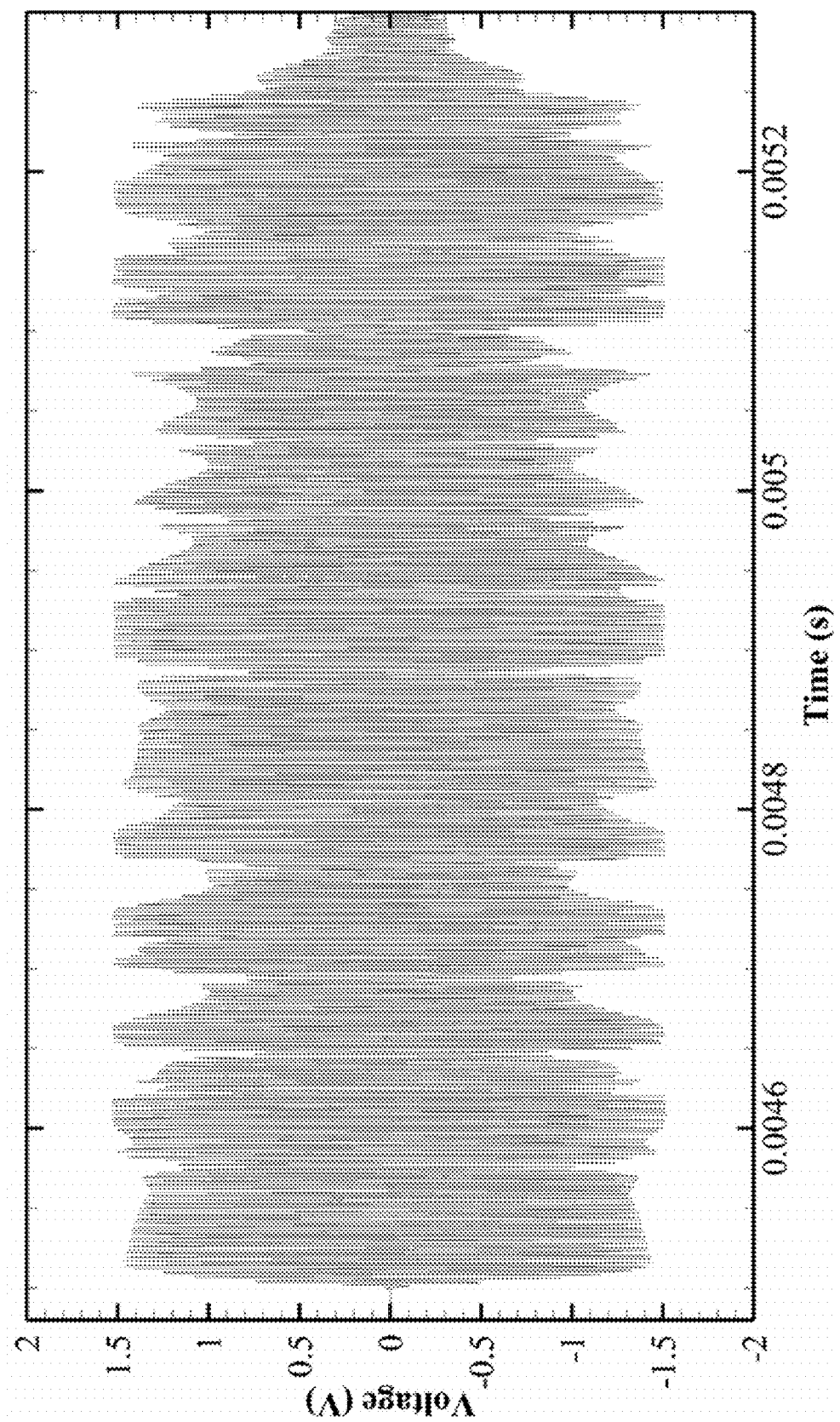

FIG. 12 is an acoustic waveform received from an implanted transmitter of the present disclosure.

DESCRIPTION

This disclosure is submitted in furtherance of the constitutional purposes of the U.S. Patent Laws "to promote the progress of science and useful arts" (Article 1, Section 8).

Self-powered acoustic transmitters that include a piezoelectric beam to harvest the mechanical energy from the swimming motion of a live juvenile sturgeon, in which the transmitter was implanted subdermally, are provided. This transmitter can significantly expand the capabilities in long-term fish tracking and studies of their migratory behavior. Prototypes with piezoelectric beams of two different lengths were implanted and demonstrated in a 53-cm long rainbow trout and a 38-cm long juvenile sturgeon, respectively.

The transmitters and methods of transmitting will be described with reference to FIGS. 1-12. Referring first to FIG. 1 an implanted animal 10 is shown having an animal body 12 and transmitter 14 implanted therein. Body 12 is represented with dashed lines to indicate that it can be a whole or portion of the animal body. Body 12 can be the body of most animals; fish, mammals, and/or reptiles for example. These animals are typically ambulatory, moving utilizing their musculoskeletal system with repetitive motions most of which are articulated in at least one cross section. As an example, fish swim by moving their tail back and forth; deer run by extending their legs; and reptiles may perform a combination of both, for example. The transmitter of the present disclosure can harness the energy of this movement to power a transmitter implanted in mechanical association with portions of the musculoskeletal system of the animals that provide this movement through repetitive motion.

Transmitter 14 can be elongated as shown in relation to body 12 and this elongated transmitter can be configured to flex 16 in at least one cross section with the musculoskeletal movement of the animal and with each flex powering the transmitter. Example transmitters can be 77 mm long, 5.3 mm wide, and only 1 mm thick for the most part of its body and weigh no more than 1 gram.

In accordance with example embodiments, transmitter 14 can include an energy harvesting element such as a piezoelectric beam.

Referring next to FIGS. 2A-B, transmitter 20 is shown than can include an energy harvesting element 22, such as the piezoelectric beam, control circuitry 22, and a transducer 26. While shown as configured as a transmitter that generates sonic vibrations with the transducer, the control circuitry can be configured to generate RF as well. Example RF generating circuitry is shown and described in U.S. patent application Ser. No. 15/087,936 filed Mar. 31, 2016, the entirety of which is incorporated by reference herein.

Element 22 can be a piezoelectric beam for example that is constructed of piezoelectric ceramics (e.g. Volture® by MIDE), polymers (e.g. the LDT series of the piezoelectric film sensors by Measurement Specialties) or composites (e.g. the Piezoelectric Fiber Composite by Advanced Ceramics and the Macro Fiber Composite by Smart Material).

In addition to piezoelectric performance, the flexibility and the maximum strain limit of the beam are also the main factors to consider when selecting the energy harvesting element for the self-powered transmitter. The Macro Fiber Composite (MFC) beams can be selected as the piezoelectric energy harvesting element for this study because they offer a good balance between the flexibility required to accommodate an animal, such as a fish's bending, and piezoelectric energy conversion capability.

The feasibility of the self-powered transmitter was assessed by estimating the amount of power that could be harvested from bending the MFC beam against the power consumption of the transmitter. The active layer of a P2-type MFC beam is essentially a bundle of rectangular PZT ceramic rods with structural epoxy filled around them to inhibit crack propagation in the ceramic during bending. Therefore, its energy harvesting performance can be estimated by treating these rods as a monolithic piece of PZT ceramic sheet that has the same active area. Under open circuit conditions, the generated energy from a single bending motion is stored in the PZT as static electrical energy, which can be calculated by Equation (1) where C is the capacitance of the beam and V is the open-circuit voltage from the bending:

$$E = \tfrac{1}{2}CV^2 \quad (1)$$

C and V can be respectively calculated using the following equations where $d_{31}$ is the piezoelectric charge constant of the PZT, $s_{33}^T$ is the permittivity of the PZT, and T is the stress that the PZT experiences during bending. l, w and h are the length, width and thickness of the active area of the beam, respectively:

$$C = \frac{s_{33}^T l w}{h} \quad (2)$$

$$V = -\frac{d_{32}}{s_{33}^T} hT \quad (3)$$

T can be calculated from the bending strain ($\delta$) and the tensile modulus of the PZT (Y):

$$T = \delta Y \quad (4)$$

By substituting Equations (2), (3) and (4) into Equation (1), we have $$E = lwh \frac{(d_{31} \delta Y)^2}{2 s_{33}^T} \quad (5)$$

Assuming that the implanted fish bends with bending radius of 10 cm, the maximum strain experienced by the MFC is estimated to be approximately 900 ppm, which is well below the operational tensile strain limit of the MFC (4500 ppm). To estimate the energy conversion capability of a P2-type MFC beam under bending, one can assume that the entire beam experiences an average strain of half the maximum strain experienced at the center of the beam. For an M-8503-P2 MFC beam that has an active area of 85×3 mm$^2$, inputting the actual values of the parameters in the equation, we can show that V=18 volts and E=4.3 μJ. Where the tail beat frequency of the implanted fish is 1 Hz (i.e. the tail bends twice within one second), the generated power from the beam would be 8.6 μW.

The energy consumption for one small injectable acoustic micro-transmitter used in JSATS was measured to be 12 μJ per transmission with the source level set to 150 dB (re: 1 μPa at 1 meter). If a typical pulse rate interval (PRI, or ping rate) of 3 seconds is used, the power requirement of the transmitter would be 4 μW. This value is less than the generated power from the M-8503-P2 MFC beam at 1 Hz. Consequently, the beam could supply adequate power to the referenced JSATS transmitter during periods of fish movement at the given source level and PRI.

Embodiments of the transmitter can have different configurations. For example, option 1 according to one embodiment, and option 2 according to another embodiment of the self-powered transmitter are described for example purposes only. These options are depicted in FIG. 2B. Option 1 contains no battery and transmits signals only when the transmitter has harvested energy sufficient for multiple transmissions, whereas Option 2 transmits continuously at a set ping rate and has a rechargeable battery that stores the harvested energy.

The Option 1 design may include three main components (FIG. 2A): a PZT tube transducer 26 that transmits acoustic signals, a control circuitry 24 including a circuit board that contains both the transmission circuit and the energy harvesting circuit, for example, and energy harvesting element 22 such as a MFC beam that harvests the energy from the bending of the fish body. The transducer and the circuit board can constitute the thickest portion of the transmitter body, which is 3.0 mm thick and account for about 10-20% of the total body length, dependent upon the length of the MFC beam used. The MFC beam portion of the transmitter can contribute most of the body length and is 1 mm thick. The 100-mm version of the prototype can weigh 1.05 grams and the 77-mm version weighs just 0.80 grams.

The Option 2 design may include a rechargeable battery and a different circuit that includes one or more power management components due to the inclusion of the battery. The transmitter is elongated in shape as previously described with the rechargeable battery attached to the opposing end of the harvesting element. As such the transmitter can be less than 100 mm in length and/or from between 77 mm and 100 mm in length. The transmitter can be less 1.05 grams and/or from 0.80 to about 1.05 grams in weight.

Examples of the rechargeable battery used for some embodiments of the transmitter can be batteries with cathode materials such as Lithium cobalt oxide ($LiCoO_2$), lithium nickel manganese cobalt (NCM), lithium iron phosphate (LFP), lithium manganese phosphate (LMP), lithium manganese oxide spinel ($LiMn_2O_4$) and lithium nickel manganese oxide spinel ($LiNi_{0.5}Mn_{1.5}O_4$), nickel-cobalt-aluminum oxide (NCA), sulfur; and anode materials such as graphite, lithium metal, lithium titanate (Li4Ti5O12), silicon and tin.

Figure 3A:
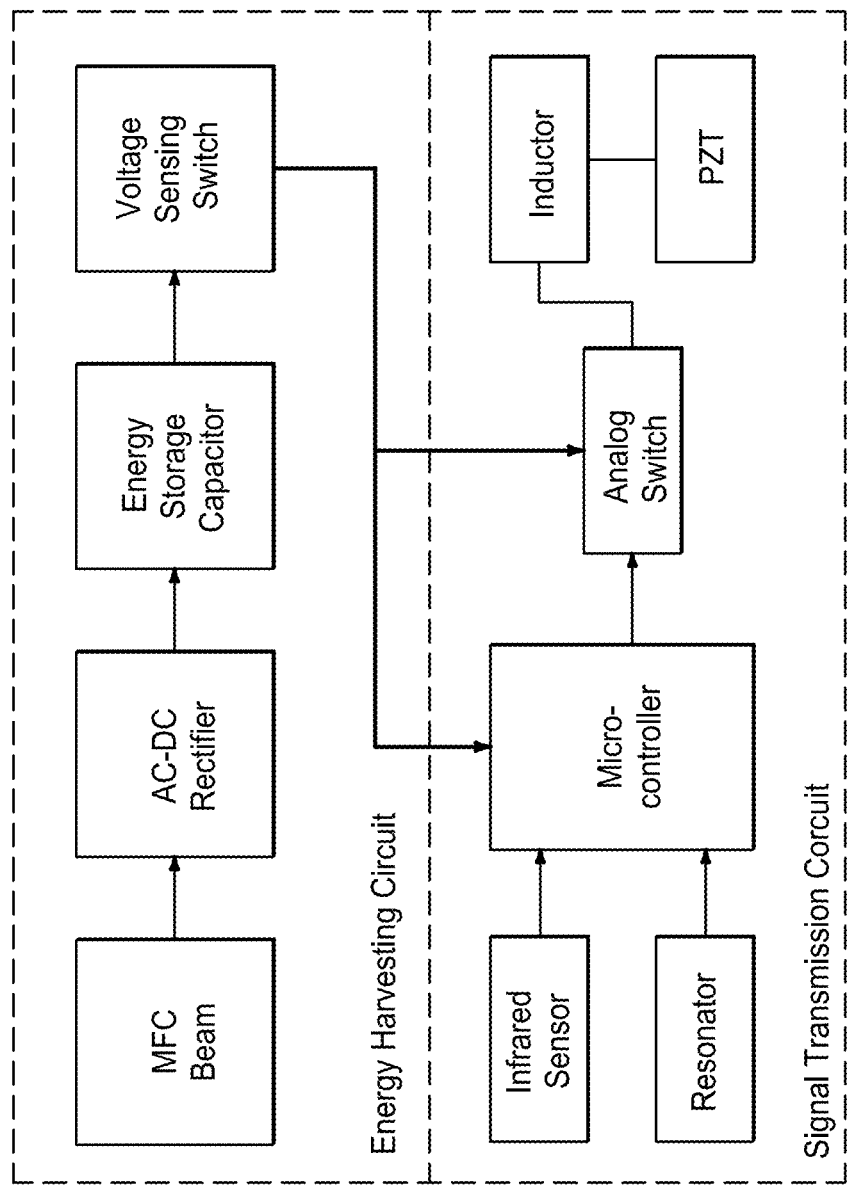
Figure 3B:
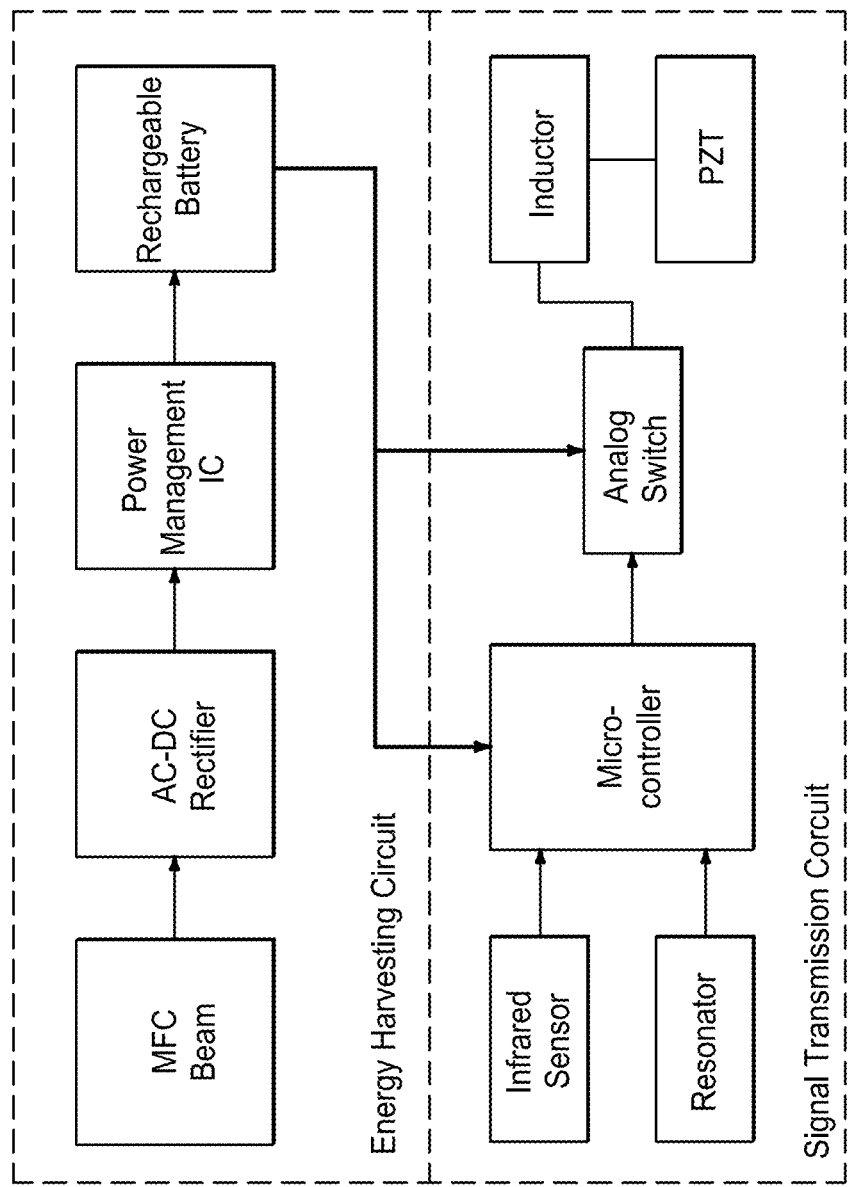

Representative block diagrams of two example transmitters are shown in FIGS. 3A-B. FIG. 3A corresponds to the option 1 design, whereas FIG. 3B corresponds to the option 2 design.

With reference to FIG. 3A, the option 1 design includes two sub-circuits that handle two distinct functions: energy harvesting and signal transmission. The energy harvesting circuit includes a piezoelectric element such as an MFC beam, a rectifier for converting the alternating current (AC) output of the piezoelectric element to direct current (DC), an energy storage capacitor, and a voltage sensing switch. The signal transmission circuit includes a controller such as a microcontroller, a sensor such as an optical sensor for activating and configuring the transmitter, a resonator for driving the controller, an analog switch for applying the desired voltages to the acoustic element, an inductor for establishing a resonance frequency with the acoustic element, and the acoustic element such as a PZT transducer.

With reference to FIG. 3B, the option 2 design also includes an energy harvesting circuit and a signal transmission circuit. In this case, the energy harvesting circuit includes a piezoelectric element such as an MFC beam, a rectifier for converting the alternating current (AC) output of the piezoelectric element to direct current (DC), a power management integrated circuit (IC), and a rechargeable battery. The signal transmission circuit in this embodiment is substantially similar to that used in the option 1 design.

Figure 4:
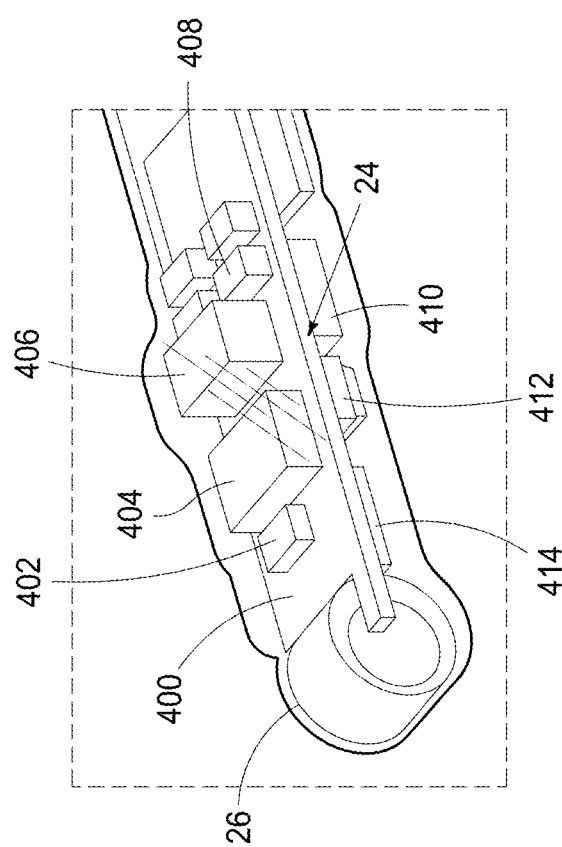

Representative component configurations of the transmitter are shown in FIG. 4. In accordance with example implementations, operatively coupled to one side of circuit board 400 can be analog switch 402, microcontroller 404, capacitor 406, and AC-DC rectifier 408. Operatively coupled to the opposing side of circuit board 400 can be voltage sensing switch 410, resonator 412, and inductor 414.

Various portions of the transmitters may be encapsulated within a coating that defines a capsule. The capsule may be composed of a flexible material such as urethane rubber (e.g. ClearFlex 95, Smooth-On Inc., East Texas, Pa., USA) or silicone gel (e.g. Ecoflex, Smooth-On Inc., East Texas, Pa., USA). The capsule may include an exemplary length of about 15 mm, but length is not limited. The diameter of the capsule at the widest point along the length may be about 3.4 mm. Final weight may be at or below about 228 mg, not including the energy harvesting beam.

For transmitters that would be entirely encapsulated in urethane rubber and implanted into a live fish, there would be no wire connections for electrical measurements.

Figure 5A:
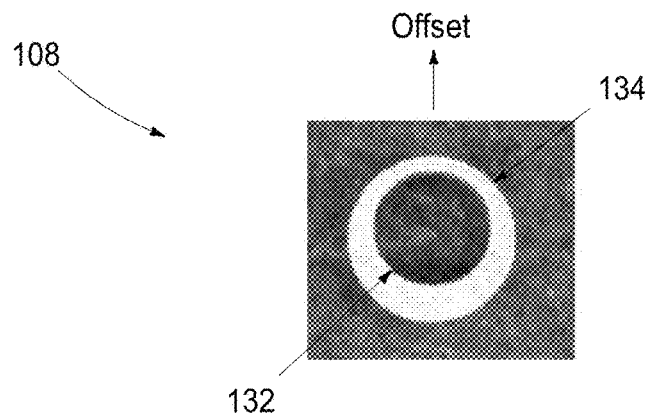

FIG. 5A shows a top view of a piezoelectric tube transducer 108 of an offset inner circumference (IC) design. Piezoelectric transducer 108 converts electrical energy from the power source (FIGS. 4A-C) into ultrasonic energy (i.e., an acoustic signal) that is transmitted to a receiver (not shown). Piezoelectric transducers 108 may be constructed of any suitable piezoelectric ceramic material including, e.g., lead zirconate titanate (PZT), lead magnesium niobate-lead titanate (PMN-PT), or lead-free ceramic materials such as sodium potassium niobate (KNN) and bismuth sodium titanate (NBT). IC-offset piezoelectric transducer 108 may include an inner wall 132 and an exterior (outer) wall 134 that are not concentric. The circumference of inner wall 132 may be offset from the center position of exterior wall 134. When assembled into the injectable tag, the IC-offset piezoelectric transducer 108 may be oriented with the thinnest portion of the transducer wall facing the front of the tag. The offset maximizes energy delivered to the piezoelectric transducer in the direction of the offset. Dimensions of piezoelectric transducer 108 may be tailored to provide a selected operation frequency. Frequencies are not limited. In some embodiments, the resonance frequency is selected to be about 416.7 kHz. In the instant embodiments, IC offset piezoelectric transducer 108 may include an exterior (outer) wall 34 with an O.D. of about 2.4 mm to about 2.6 mm, an inner wall 32 with an I.D. of about 1.7 mm to about 1.9 mm, and a thickness in the offset direction of about 0.15 mm. Dimensions of piezoelectric transducer 108 may include a tolerance of at least about ±0.05 mm. In some embodiments, piezoelectric transducer 108 may have a resonance frequency about 10 kHz to 50 kHz higher than the frequency of the drive signal that drives piezoelectric transducer 108. The higher frequency compensates for frequency downshifts that may be caused by the epoxy or resin coating on the piezoelectric transducer.

Figure 5B:
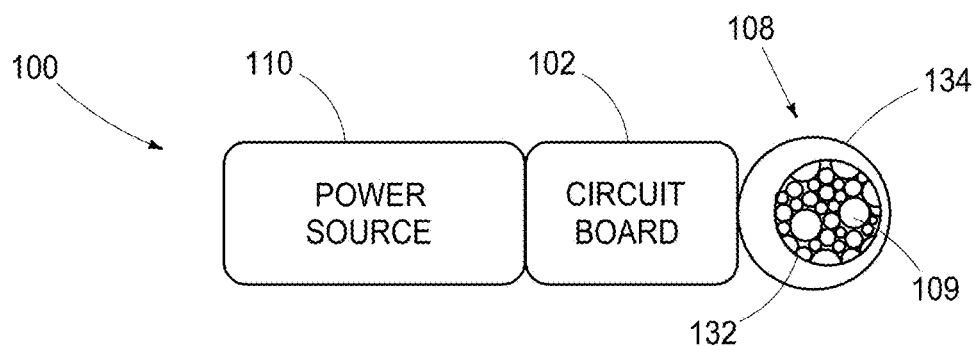

FIG. 5B is a schematic showing component 100 in assembled form configured with an inner circumference (IC) offset piezoelectric transducer 108 positioned at a front end of the device, a power source 110 at a back end of the device, and a circuit board 102 in the middle section. IC-offset piezoelectric transducer 108 may include an inner wall 132 with an inner circumference (IC) and an exterior (outer) wall 134 that are offset in the forward transmission direction. The offset may enhance the source level of the acoustic signal when the piezoelectric transducer is polarized (activated) along the thickness direction. Piezoelectric transducer 108 may include a closed-cell foam 109 composed of, e.g., EPDM rubber or a like elastomer positioned so as to be bounded by inner wall 132 of piezoelectric transducer 108 that enhances acoustic properties of piezoelectric transducer 108. Dimensions of IC-offset piezoelectric transducer 108 are selected that maximize the transmission range of the acoustic signal. IC-offset piezoelectric transducer 108 is preferably oriented so that the direction of the IC offset is directly pointed towards a receiver (hydrophone) (not shown) that detects the acoustic signal emitted by the piezoelectric transducer 8, but is not limited.

Figure 5C:
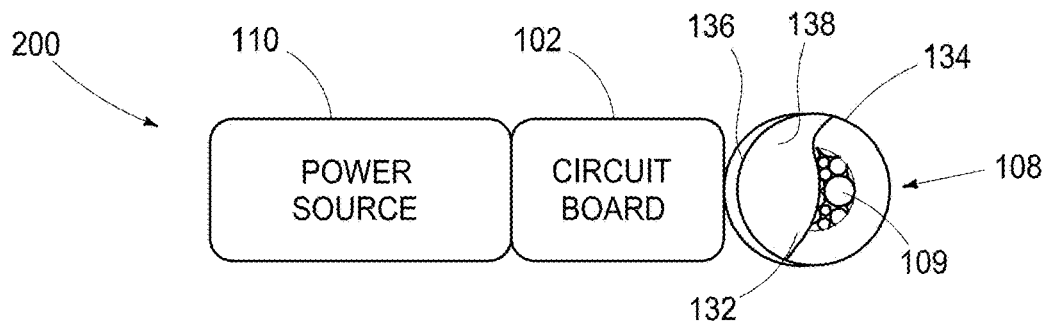

FIG. 5C shows another schematic of component 200. In the figure, piezoelectric transducer 108 may include an inner wall 132 and an exterior (outer) wall 134 that are concentric or that are offset as detailed previously herein. Component 200 may also include an acoustic reflector 136 attached behind piezoelectric transducer 108 in front of power source 110 and circuit board 102. Acoustic reflector 136 reflects acoustic signals emitted from piezoelectric transducer 108 and enhances transmission in the forward direction from component 200 as detailed further herein. In some embodiments, acoustic reflector 136 may include or be composed of an ultra low density material such as EPDM closed-cell (~0.3 mm thick) foam, which may be attached to the back surface of piezoelectric transducer 108 in front of circuit board 102. The foam introduces an interface with a large acoustic impedance mismatch greater than about 20×106 kg/(m2·s) that redirects acoustic energy towards the front end of component 200. In addition, acoustic reflector 136 enhances the source level of the acoustic energy output from piezoelectric transducer 108 along the forward 180 degree wavefront by at least a factor of about 0.5 dB to about 1 dB on average, but acoustic energy values are not intended to be limited. In various embodiments, acoustic reflector 136 may include various selected thicknesses. In some embodiments, width of acoustic reflector 136 may be below about 1.5 mm to avoid blocking acoustic signals emitted from the two (i.e., left and right) sides of piezoelectric transducer 108. Thickness of acoustic reflector 136 depends in part on the size of the pores within the closed-cell foam. Thickness is preferably 2 to 3 times the size of pores within the reflector material to ensure acoustic waves encounter EPDM/air interfaces within the reflector foam at least once in order to maximize effectiveness of the reflector.

Piezoelectric transducer 108 may include a closed-cell foam 109 composed of, e.g., EPDM rubber or a like elastomer positioned so as to be bounded by inner wall 132 of piezoelectric transducer 108 that enhances acoustic properties of piezoelectric transducer 108. In some embodiments, piezoelectric transducer 108 may include end caps 138 of a selected thickness (e.g., ~0.2 mm) positioned at respective flat ends of transducer 108. End caps 138 may include or be composed of a selected metal such as copper (Cu) metal. End caps 138 may be bonded to piezoelectric transducer 108 using, e.g., a non-conductive epoxy. End caps 138 can serve to enhance the source level of the acoustic signal emitted from flat ends of transducer 108.

Figure 6A:
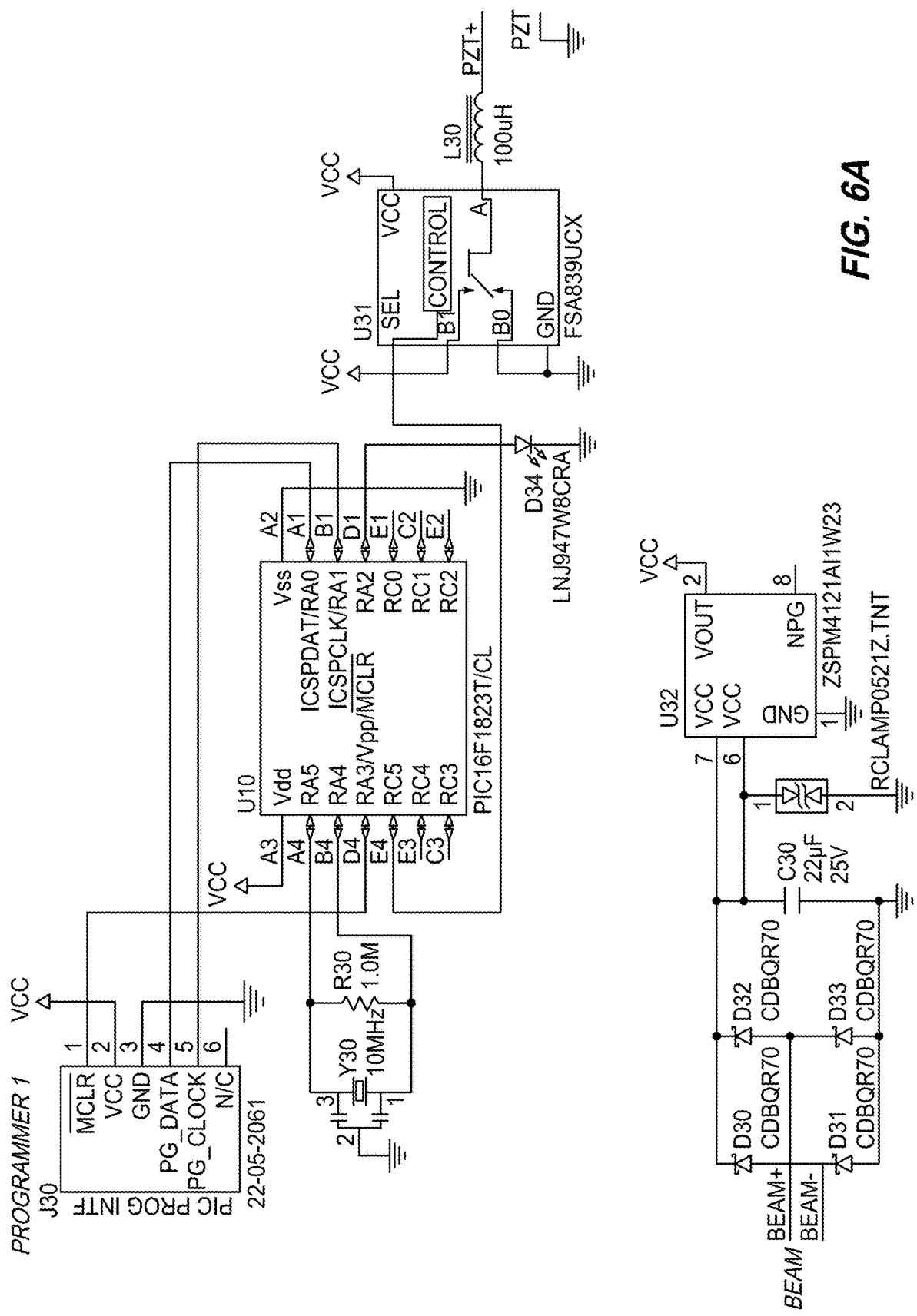
Figures 2, 6B:
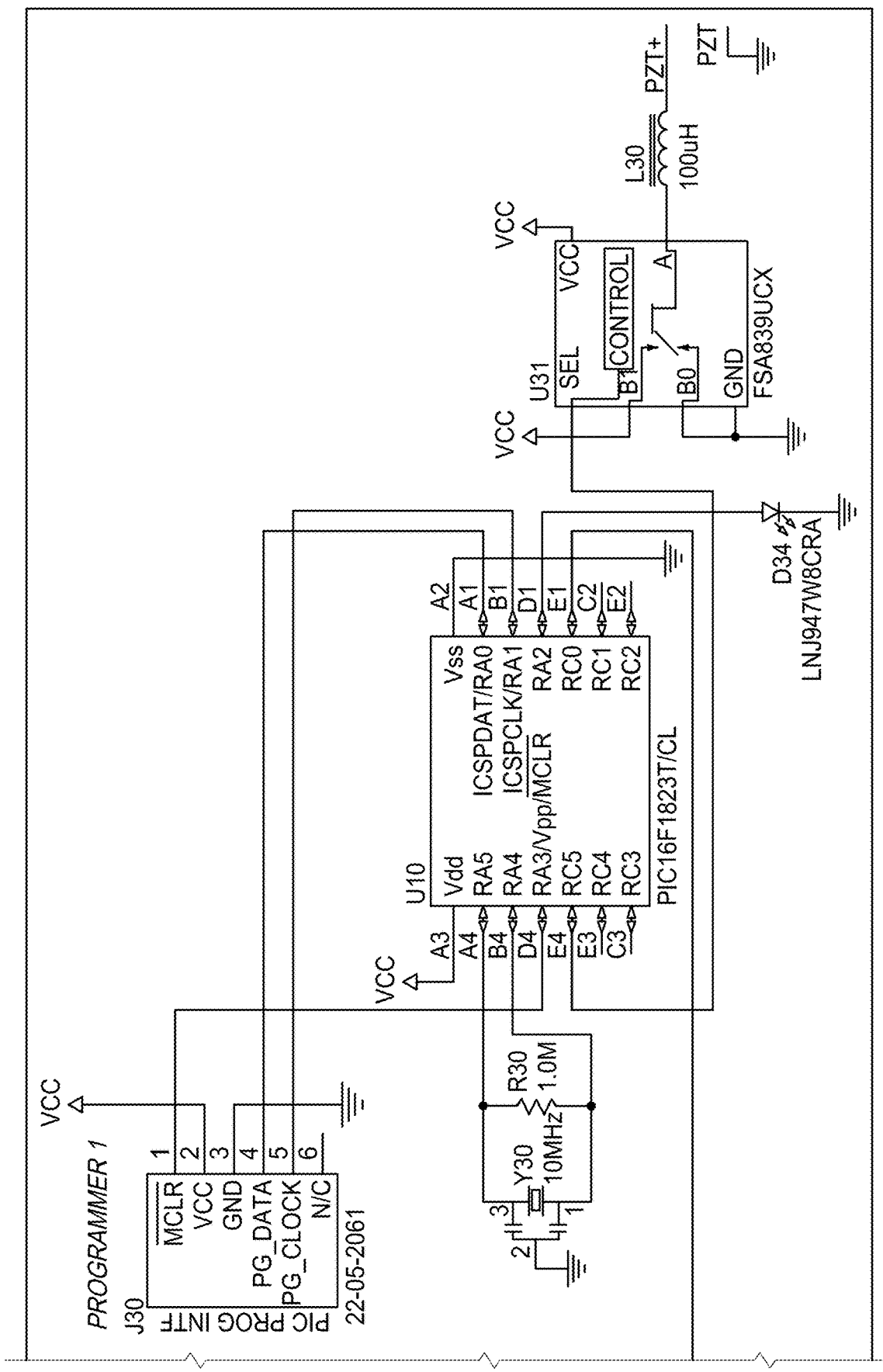

Circuit diagrams of two example transmitters are shown in FIG. 6. FIG. 6A corresponds to the option 1 design, whereas FIG. 6B corresponds to the option 2 design. Each circuit diagram includes a depiction of representative components that comprise the energy harvesting sub-circuit and the transmission sub-circuit.

With reference to FIG. 6A, the two outputs of the PZT beam are coupled to the rectifier. The rectifier uses four Schottky barrier diodes (D30-D33, CDBQR70, Comchip Technology, Fremont, Calif., USA) with low forward voltage to convert the AC output of the piezoelectric beam to DC. The resulting voltage is stored on a 22 µF ceramic capacitor (C30, C2012X5R1E226M125AC, TDK Corporation, Uniondale, N.Y., USA). A voltage clamping device (RCLAMP0521Z.TNT, Semtech Corporation, Camarillo, Calif., USA) ensures that the voltage on the capacitor does not exceed a maximum voltage (e.g., 9.3 V) to protect subsequent components. A voltage sensing switch (U32, ZSPM4121Al1W23, Integrated Device Technology Inc., San Jose, Calif., USA) can interface between the storage capacitor and the transmission sub-circuit (i.e. the load). The switch can contain a predefined set of high threshold voltage $V_H$ (e.g., 2.8 V) and low threshold voltage $V_L$ (e.g., 2.3 V). When the voltage comparator inside the switch senses that the voltage of the storage capacitor is higher than $V_H$, the switch turns on the transmission sub-circuit, which starts transmitting the acoustic signal at a set ping rate. The switch stays on so the transmission sub-circuit can draw energy from the storage capacitor until the capacitor voltage drops below $V_L$, at which point the switch shuts off. Use of voltage sensing switch with a low voltage threshold to shut off the load is to prevent the storage capacitor from being drained to a voltage level that would require the tagged fish to swim a much longer time to recover.

To achieve a reasonable level of confidence of detection, the transmitter was designed to transmit multiple signals of the same identification code with a preset ping rate so the transmitted identification code can be positively identified. The nominal signal strength of the transmitter is 150 dB (reference: 1 µPa at 1 meter), which allows the transmitter to be have a 100-meter detection range in fresh water and consumes about 10 µJ based on prior measurements. Therefore, the value (22 µF) of the storage capacitor and the threshold voltage window of the switch were carefully selected such that at least two transmissions (pings) could be made before the capacitor voltage dropped below $V_L$. The ping rate of the prototype transmitters were set to 0.5 seconds.

With reference to FIG. 6B, option 2 may use the same rectifier to convert the AC output of the piezoelectric beam to DC. A power management IC (U32, MAX17710, Maxim Integrated, San Jose, Calif.) is used to manage the charging and discharging of the rechargeable battery. When the battery voltage reaches a threshold of about 4.0-4.1 V, the MAX17710 outputs a selected voltage, e.g. 3.3 V, to the transmission sub-circuit to enable transmissions at a preset ping rate. If the battery voltage drops below a certain threshold, e.g. 2.125 V, the MAX17710 shuts off the voltage output to the transmission sub-circuit to protect the battery from over-discharge.

Both the option 1 and option 2 embodiments may share the same transmission sub-circuit. This sub-circuit was modified from the "V2" version of the JSATS injectable acoustic micro-transmitter described by Z. D. Deng, T. J. Carlson, H. Li, J. Xiao, M. J. Myjak, J. Lu, J. J. Martinez, C. M. Woodley, M. A. Weiland and M. B. Eppard, in "*An injectable acoustic transmitter for juvenile salmon*", *Scientific Reports*, 29 Jan. 2015, the entirety of which is incorporated by reference herein.

The transmission sub-circuit is depicted in FIGS. 6A-B by way of illustration. A low-power 8-bit microcontroller in a chip scale package (U10, PIC16F1823T/CL, Microchip Technologies, Chandler, Ariz., USA) controls the operation of the transmission sub-circuit. The controller may operate from input voltages between about 1.8 V and about 3.6 V. The controller may include modules or components such as, e.g., an internal oscillator; sleep mode; interrupt-on-change capability; a fixed voltage reference; a temperature sensor; timers; pulse width modulators; and a Universal Asynchronous Receiver/Transmitter (UART). A 10 MHz ceramic resonator (Y30, CSTCE10M0G52-R0, Murata Manufacturing Co., Ltd., Nagaokakyo, Kyoto Prefecture, Japan) or other clock reference such as a quartz crystal may be coupled to the controller to generate a precise clock signal. A 1 MΩ series resistor (R30, CRCW02011M00FKED, Vishay Intertechnology, Inc., Malvern, Pa., USA) may be placed in parallel with the ceramic resonator to reduce startup time and improve stability of the generated clock signal. The controller may use the clock signal as a timing reference to generate a waveform for the acoustic transducer at the desired modulation frequency (e.g., 416.7 kHz).

A light emitting diode (LED) (D34, LNJ947W8CRA, Panasonic Semiconductor, Kadoma, Osaka, Japan) provides an optical link for configuring the transmitter via an external apparatus. This component is not used in the typical manner: rather than generating light when a voltage is applied across its terminals, the LED generates a voltage across its terminals when exposed to ultraviolet light. A configuration apparatus (not shown) may utilize a USB-to-TTL converter circuit and a second LED to convert serial commands from a personal computer to a coded series of "on" and "off"

pulses of light, which then may be converted back into electrical signals by the first LED on the transmitter. This first LED is then coupled to one of the pins on the microcontroller. The above mechanism provides a small yet effective way to activate the microcontroller and specify operating parameters such as, e.g., tag codes, transmission period, and other parameters for operation prior to or following injection of the tag into the host animal. The optical link is reliable, simple, requires a minimum number of components, and avoids false triggering problems after injection of the tag into the host animal. Other embodiments of the invention may use a photodiode, phototransistor, or other sensor in place of the LED. Component selections are not limited.

The controller may be coupled to an analog switch (U31, FSA839UCX, Fairchild Semiconductor International, Inc., San Jose, Calif., USA) or other switching element to apply a desired electrical signal to the piezoelectric transducer. The analog switch or other switching element may be switched "on" and "off" in a particular pattern by the controller. In the present embodiment, the controller encodes the transmitted data by way of phase shift keying (PSK).

A 100 µH inductor (L30, XFL2006-104ME, Coilcraft, Inc., Cary, Ill., USA) may be placed in series with the piezoelectric transducer to establish an electrical resonance near a desired modulation frequency (e.g., 416.7 kHz) in conjunction with the fundamental capacitance of the piezoelectric transducer. Although optional, the inductor may help improve the acoustic source level of the transmitter.

Additional features of the present invention are detailed by Deng et al. in a document entitled "JSATS Injectable Acoustic Transmitter Reference Design Documentation" prepared by the Pacific Northwest National Laboratory (Document No.: PNNL-22372) for the U.S. Army Corps of Engineers, Portland District, March 2013, which the reference is incorporated herein in its entirety.

In various embodiments, selected components may be mounted onto a circuit board constructed of suitable or selected circuit board materials available commercially (e.g., Sierra Circuits, Inc., Sunnyvale, Calif., USA). Circuit board 400 materials may include, but are not limited to, e.g., a rigid material such as FR4 board with a thickness of about 0.008" or flexible materials such as flex board with a thickness of about 0.003". The circuit board may include exemplary spacing widths and copper line widths for electrical circuits of about 0.003", but are not limited.

While various components are described herein, components and configuration are exemplary and not so limited. For example, in various embodiments, the components of the present disclosure may include various form factors and shapes that allow the components to be injectable and tailored for selected applications. "Form factor" refers to the physical arrangement, configuration, and dimensions of components in the transmitters including, but not limited to, e.g., circuit boards, piezoelectric transducers, controllers, acoustic reflectors, inductors, capacitors, diodes, and capsules. As will be appreciated by those of ordinary skill in the art, circuit configurations and associated designs and tag components may be altered without departing from the spirit and scope of the present disclosure. Thus, no limitations are intended.

Figure 7:
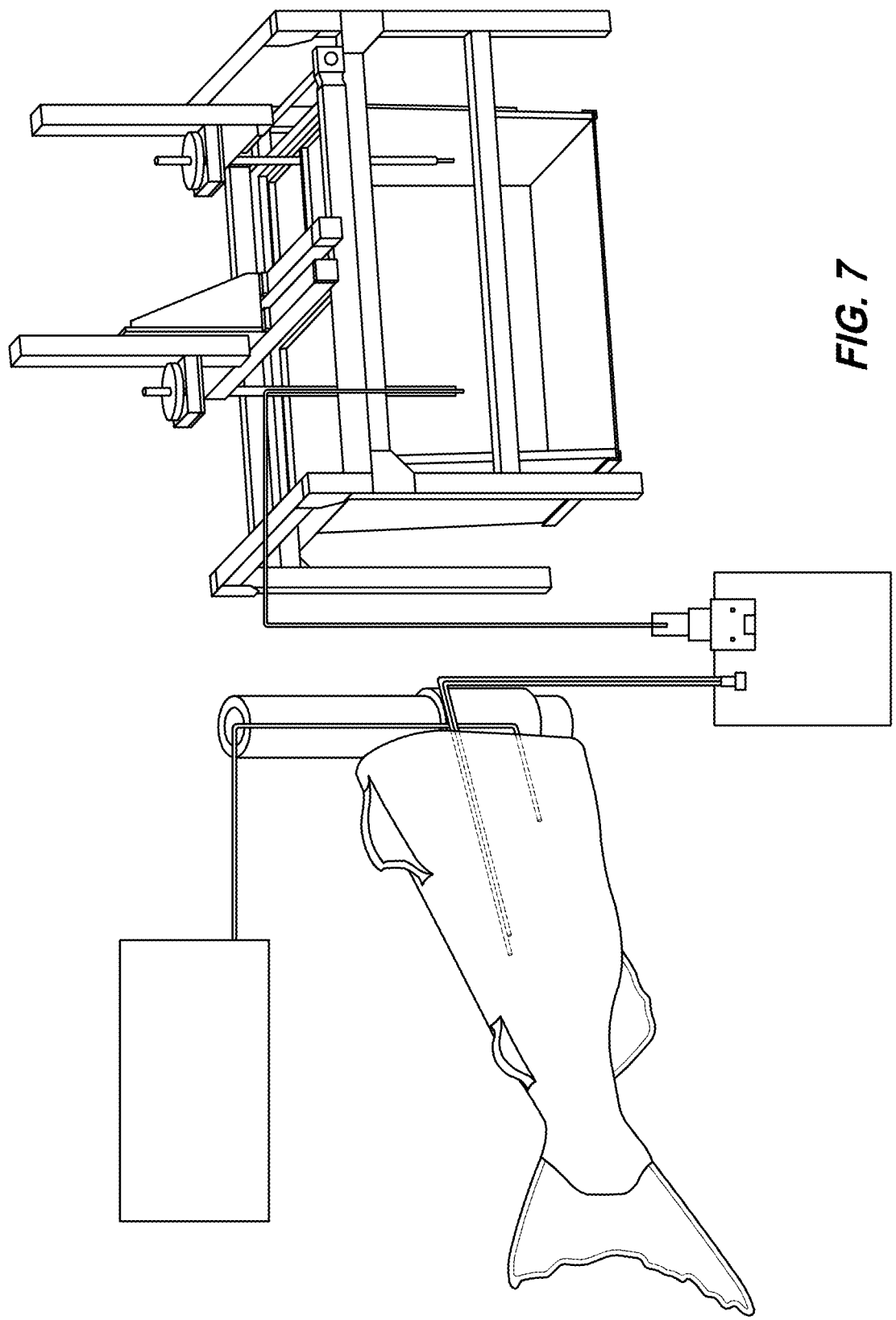
FIG. 7 depicts an example data acquisition arrangement according to an embodiment of the disclosure.

As depicted in FIG. 7, to quantitatively investigate the energy harvesting performance of the transmitter, the following components were used on the benchtop to replicate those in the actual prototype:

1) MFC beams backed with a 75-µm-thick aluminum shim and coated with same ClearFlex 95 coating as that in the actual transmitter;
2) The robotic fish described in the later sections;
3) A test circuit board containing the identical transmission and energy harvesting circuits as those in the prototype;
4) A PZT tube (same as what is used in the prototype) that was waterproofed by epoxy and had two wires connected to its inner and outer wall electrodes via a shielded coaxial cable for underwater signal transmissions.

A specific prototype transmitter used a P2-type piezoelectric Macro Fiber Composite (MFC) beam (Smart Material Corp., Sarasota, Fla., USA) as the energy harvesting element. The MFC consists of rectangular PZT-5A ceramic rods sandwiched between layers of adhesives, electrodes and polyimide film. The P2 MFC beams use $d_{31}$ effect of the PZT rods to convert mechanical energy from the beam bending into electricity. The active material area of the MFC beams used in the prototypes was 3 mm wide. To target fish of different sizes, prototypes of two different lengths, 100 mm and 77 mm, were developed, which used the M-8503-P2 (active material area: 85×3 $mm^2$) and M-5003-P2 (active material area: 50×3 $mm^2$) MFC's, respectively. To enhance the power output of the beam, a 75-µm thick aluminum shim was attached on the back of the active material using epoxy. The circuit that handled the transmission of the prototype used a modified version of the JSATS injectable transmitter's circuit. This circuit was designed to transmit at a signal strength of 150 dB (reference: 1 µPa at meter), which would provide a detection range of 100 meters, approximately, in a quiet water environment. The piezoelectric transducer used in the prototype transmitter for transmitting acoustic signals was a 610HD PZT ceramic tube (TRS Technologies, State College, Pa., USA) that had an outer diameter of 2.54 mm, an inner diameter of 1.80 mm and a length of 1.75 mm. The center of the inner circumference of the tube was offset by 0.15 mm from that of the outer circumference. The MFC beam and the PZT transducer was attached to the circuit board by soldering and silver epoxy, respectively. The transmitter assembly was first coated with a 25-µm thick Parylene-C layer and then encapsulated with ClearFlex 95 urethane rubber (Smooth-On Inc., East Texas, Pa., USA). Another 25-µm layer of Parylene-C was deposited on the outside of the transmitter as a waterproof and biocompatible layer.

The implantation location was selected on the back of the robotic fish under the dorsal fin and the amount of bending of the robotic fish body was carefully configured so the bending radius of the robotic fish body was as close to 10 cm as possible. To insert the MFC beam, a pocket was created by slicing with an X-ACTO knife. The pocket was slightly longer than the beam and about 1 mm beneath the robotic fish's body surface. The beam was then placed inside the pocket and sealed using the Ecoflex 00-30 gel (Smooth-On Inc., East Texas, Pa., USA).

To evaluate the energy harvesting performance of the prototype, MFC beams with the same specifications as those used in the prototypes were tested on a benchtop setup. They were also coated with the ClearFlex 95 of the same thickness as that on the actual prototypes. To mimic the swimming motion of fish, a robotic fish was fabricated based on the 3D representation of an actual chinook salmon. It contained three interconnected servo-motors wrapped inside a soft silicone gel skin. To allow the beam to bend with the fish body, the self-powered transmitter was designed to be implanted sub-dermally instead of inside the fish's body cavity, because the body cavity would allow too much room for the beam to relax and thus might limit the achievable amount of bending of the beam. Therefore, for the benchtop experiment, the MFC beam was inserted on the back of the robotic fish in a pocket under the dorsal fin (shown in FIG. 10A) and about 1 mm underneath the surface of the faux fish. During testing, the robotic fish was controlled via an Arduino Due board and was driven with a tail beat frequency of 1 or 2 Hz. The bend radius of the robotic fish body was set at approximately 10 cm to be consistent with the assumed value used in the feasibility assessment. The MFC beam was electrically connected to a test circuit board that had the same circuit as the actual prototype. The output of the circuit board was connected to a PZT tube transducer that was the same as the ones in the actual transmitter prototype. The transducer was epoxy coated so it can be tested underwater for transmission performance. The output voltage of the MFC beam and the voltage of the storage capacitor that stored the harvested energy were monitored by an oscilloscope.

Figure 8:
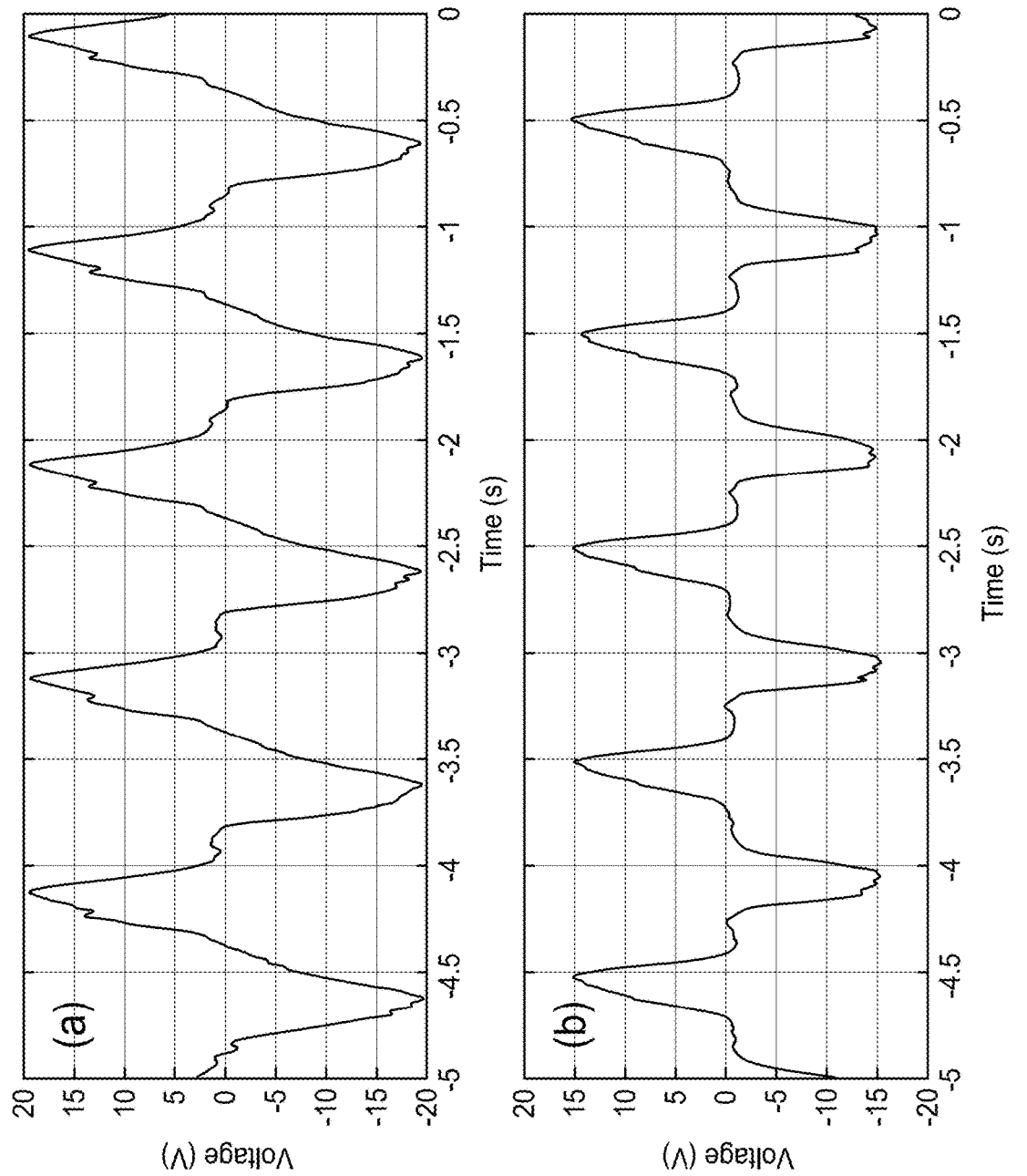
FIG. 8 depicts additional data acquired during experimentation.

The open circuit voltages of the 8503 and 5003 MFC beams at tail beat frequencies of 1 Hz are shown in FIG. 8. The 8503 was outputting about V in amplitude, consistent with the theoretical calculation results obtained in the feasibility assessment. The 5003, on the other hand, was outputting about 16 V in amplitude, slightly lower than that of the 8503 beam, which could be because the longer length of the 8503 beam allowed it to more readily conform to the fish's body, hence incurring slightly higher strain, as the fish bent.

FIGS. 9A-B shows the voltage of the 22-µF storage capacitor as a function of time at tail beat frequencies of 1 Hz and 2 Hz. In this experiment, the transmitter was programmed to transmit at a PRI of 0.5 seconds once the capacitor voltage reached 2.8 V using a transmitter embodiment having no battery. The voltage first ramped up continuously from zero volts as the capacitor was charged by fish bending. As the voltage reached the high voltage threshold $V_h$ of the voltage sensing switch, the transmitter started drawing energy from the capacitor and initiated transmissions. The voltage of the capacitor thus dropped abruptly. The length of each JSATS signal was 0.74 ms. The $V_h$ (2.8 V) and $V_L$ (2.3 V) of the switch dictated that the 22-µF capacitor would release about 28 µJ of energy to the transmission sub-circuit. Each transmission was designed to consume about 12 µJ. This energy consumption was confirmed by measuring the current draw of the transmission circuit and transducer through a 10-ohm resistor when they were driven by a DC power supply outputting 2.5 V. Therefore, the capacitor contained a sufficient amount of energy to make at least 2 transmissions before its voltage dropped below VL. One can see in FIG. 9 that when the first transmission ended, the capacitor voltage usually dropped to about 2.3 V and the voltage increased back up again as the fish's swimming motion continued. At 0.5 seconds after the first transmission, a second transmission occurred as programmed and the capacitor voltage continued to drop and reached $V_L$, at which point the switch turned off and the transmitter completed a transmission "bundle". From this point on, the capacitor would need to be recharged to 2.8 V in order for the transmitter to transmit again. At 1 Hz, it took the 8503 and 5003 beams 15 and 35 seconds, respectively, to charge up the storage capacitor from a completely drained state (0 V) to 2.8 V so it could start transmitting. As the fish continued the swimming motion at the same frequency, the transmission bundles were able to maintain a constant interval of 3 seconds for the 8503 and 6 seconds for the 5003, which corresponded to energy harvesting power of 9.3 µW and 4.7 µW, respectively. These values were consistent with the aforementioned feasibility assessment. At 2 Hz, the capacitor was charged to 2.8 V much more quickly. It took the 8503 and 5003 merely 6.5 and 13 seconds, respectively, to start the first transmission. The 5003 was able to maintain a constant interval of about 2 seconds between the transmission bundles as the robotic fish continued to "swim" at that frequency, which corresponded to energy harvesting power of 14 µW. On the other hand, for the 8503, the power input to the transmitter was so sufficient that not only the transmitter could maintain continuous transmission at the set 0.5-sec PRI but the overall voltage level of the capacitor slowly crept up over time, which indicated an energy harvesting power greater than 24 µW.

To characterize the energy harvesting performance of the transmitter having the battery, a 1-mAh commercial thin film battery (LiCoO2) and a Li-NCA battery (0.3 mAh) were both tested at a tail beat frequency of 1 Hz with one or two 8503 MFC beams as the energy harvesting elements. FIGS. 10A-B show the voltage of both batteries as a function of time at their charged state (hence the transmitter was continuously transmitting). The PRI of the transmitter was set to 9.2 seconds.

When powered by just one 8503 beam, the thin film battery was able to keep its voltage at a constant level, which indicates a self-sustained operation of the transmitter. For comparison, the same experiment was also conducted with the energy harvesting portion of the device disabled. The battery voltage continuously decreased as expected because of the power draw of the transmission sub-circuit.

The Li-NCA battery showed similar results: a single 8503 MFC beam could barely maintain the battery's voltage level to support continuous operation of the transmitter. Therefore, an additional 8503 beam was added to enhance the performance. The two 8503 beams were stacked together by using hot-melt glue and implanted into the robotic fish and they were connected in parallel to charge the battery. The result showed that this configuration was able to achieve self-sustained operation of the transmitter. The continuously increasing battery voltage indicated that the harvested power from two 8503 MFC beams could even support the power requirement of the transmitter at a lower PRI.

To verify the benchtop results and demonstrate the functioning of the self-powered transmitters, two prototype transmitters using the 8503 and 5003 MFC's, respectively, were fabricated for the live fish experiment. The transmitters were 100 mm and 77 mm long, respectively, and used the identical transmission sub-circuits and PZT transducers. The 100-mm transmitter was implanted in the trout and the 77-mm one was implanted into the sturgeon as shown in FIGS. 11A-B. After the implantation, both fish were placed into a circular tank (diameter: 1.2 meters) that was installed with two hydrophones for listening to the transmitted acoustic signals.

The implantation of the prototype transmitters and the live fish experiment were performed at the Aquatic Research Laboratory (ARL) of Pacific Northwest National Laboratory (PNNL). Because of the length difference of the two prototypes, fish of two different lengths, a 53-cm-long rainbow trout and a 38-cm-long juvenile white sturgeon, were chosen as the test fish for implantation. As in the robotic fish, these prototypes were implanted on the back of the fish near the dorsal fin. However, considering that the MFC's in real fish may experience much higher degree of bending than in the robotic fish in some occasions, which may damage the PZT fibers within the MFCs, the implantation locations for the two test fish were selected in the front-half of the fish torso where much less bending occurs. Prior to implantation, fish were anesthetized with 80 mg/L of tricaine methanesulfonate to stage 4 anesthesia. During implantation, a 6-mm incision was first made with a scalpel that only cut barely beneath the skin. A flattened stainless steel 8-gauge needle was then used to carefully separate the skin from the muscle to open a channel that was about 2 mm longer than the transmitter length. The transmitter was then inserted into the channel with the transducer end entering first. Once the transmitter was completely inserted, the incision was sutured with one knot using 3-0 suture. The entire implantation process took about 75 seconds. After implantation, both fish were placed into a circular tank (diameter: 1.2 meters) with two hydrophones (Model SC001, Sonic Concepts Inc., Bothell, Wash., USA) installed and filled with room-temperature river water for recovering and acoustic signal monitoring.

The fish recovered from anesthesia and started transmitting coded acoustic signals just several minutes after being released into the circular tank. The individual tag IDs belonging to the two transmitters were successfully detected by the JSATS software (FIG. 12). The transmitter inside the juvenile sturgeon was making more than one hundred transmissions per hour, much more frequently than the one inside the trout was, although the MFC used in that transmitter was the shorter one (5003). Based on our observation, the trout was probably transmitting less frequently because the implantation location on the trout was a bit too forward relative to its body length, resulting in a much lower degree of bending as it swam. Another reason could be that the circular tank was relatively small for the size of the trout and hence limited its swimming activity. On the other hand, due to its smaller size, the sturgeon appeared to have to swim more frequently to keep itself stationary against the circulating water flow inside the tank. Its tail beat frequency was observed to be mostly around 2 Hz, while the trout's swimming behavior was much more erratic and the degree of body bending was much less most of the time, compared to the sturgeon.

Both transmitters were able to make transmissions inside the fish body for at least about two weeks.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect. The invention is, therefore, claimed in any of its forms or modifications within the proper scope of the appended claims appropriately interpreted in accordance with the doctrine of equivalents.

The invention claimed is:

1. A fish transmitter comprising:
a transducer configured to transmit a signal, wherein the transducer is IC-offset and defines a front wall that is thinner than a rear wall of the transducer in at least one cross section;
process circuitry coupled to the transducer;
an energy harvesting element extending lengthwise from the process circuitry, the process circuitry residing between the transducer and the energy harvesting element and arranged linearly beginning with the transducer and ending with the energy harvesting element, wherein the transmitter is configured to be implanted linearly along the length of the fish between the lateral line and the dorsal fin of the fish, and harvest energy from the fish's swimming movement;
wherein the transmitter has two portions, a first portion having a first portion height in at least one cross section and a second portion having a second portion height in at least the one cross section, the second portion height being larger than the first portion height; and
wherein the energy harvesting element resides in the second portion and the transducer and process circuitry reside in the first portion, the first portion being proximate the tail of the fish and the second portion being proximate the head of the fish when implanted.

2. The transmitter of claim 1 wherein the transducer is configured to transmit an acoustic signal.

3. The transmitter of claim 1 wherein the process circuitry is configured as a circuit board, the circuit board comprising both a transmission circuit and an energy harvesting circuit.

4. The transmitter of claim 3 wherein the energy harvesting circuit comprises:
an AC to DC rectifier;
an energy storage capacitor; and
a voltage sensing switch.

5. The transmitter of claim 1 wherein the energy harvesting element is configured to operationally engage the fish's musculoskeletal system.

6. The transmitter of claim 1 wherein the processing circuitry is configured to receive AC from the energy harvesting element, convert the AC to DC and store the DC.

7. The transmitter of claim 1 further comprising a voltage sensing switch configured to engage signal transmission when power is above a predetermined level and disengage power when it is below a predetermined level.

8. The transmitter of claim 1 wherein an entirety of the energy harvesting element is configured to be received within the body of the fish.

* * * * *

UNITED STATES PATENT AND TRADEMARK OFFICE
CERTIFICATE OF CORRECTION

PATENT NO. : 11,278,004 B2
APPLICATION NO. : 15/088032
DATED : March 22, 2022
INVENTOR(S) : Z. Daniel Deng et al.

It is certified that error appears in the above-identified patent and that said Letters Patent is hereby corrected as shown below:

On the Title Page

Item (56) References Cited, 2nd Column, 7th Line - Replace "3,100,866 A 8/1963 Marks" with --3,100,886 A 8/1963 Marks--

Item (56) References Cited, page 2, 1st Column, 49th Line - Replace "6,926,765 B2 8/2005 Brickett" with --6,928,765 B2 8/2005 Brickett--

Item (56) References Cited, page 3, 1st Column, 41st Line - Replace "$(CF_x)_n$ (0.33<x<9,66) in Lithium Batteries", Journal of Power" with --$(CF_x)_n$ (0.33<x<0.66) in Lithium Batteries", Journal of Power--

Item (56) References Cited, page 5, 2nd Column, 10th Line - Replace "WO PCT/US2016/055045 IPRP, Jun. 19, 2018 Battalle Memorial" with --WO PCT/US2016/055045 IPRP, Jun. 19, 2018 Battelle Memorial--

Item (56) References Cited, page 5, 2nd Column, 21st Line - Replace "China Electrical Appliance Industrial Insttute, Editor of "Electrical"" with --China Electrical Appliance Industrial Institute, Editor of "Electrical--

In the Drawings

Drawing Sheet 3 of 16, FIG. 3A - Replace "Signal Transmission Corcuit" with --Signal Transmission Circuit--

Drawing Sheet 4 of 16, FIG. 3B - Replace "Signal Transmission Corcuit" with --Signal Transmission Circuit--

Drawing Sheet 12 of 16, FIG. 9A - Replace "3,5" with --3.5--

Drawing Sheet 12 of 16, FIG. 9A - Replace "3,5" with --3.5--

Signed and Sealed this
Twenty-first Day of February, 2023

*Katherine Kelly Vidal*

Katherine Kelly Vidal
*Director of the United States Patent and Trademark Office*

CERTIFICATE OF CORRECTION (continued)
U.S. Pat. No. 11,278,004 B2

Drawing Sheet 12 of 16, FIG. 9B - Replace "3,5" with --3.5--

Drawing Sheet 12 of 16, FIG. 9B - Replace "3,5" with --3.5--